US009378285B2

(12) United States Patent
Marchisio et al.

(10) Patent No.: US 9,378,285 B2
(45) Date of Patent: *Jun. 28, 2016

(54) EXTENDING KEYWORD SEARCHING TO SYNTACTICALLY AND SEMANTICALLY ANNOTATED DATA

(71) Applicant: VCVC III LLC, Seattle, WA (US)

(72) Inventors: Giovanni B. Marchisio, Kirkland, WA (US); Navdeep S. Dhillon, Seattle, WA (US); Carsten Tusk, Seattle, WA (US); Krzysztof Koperski, Seattle, WA (US); Jisheng Liang, Bellevue, WA (US); Thien Nguyen, Edmonds, WA (US); Matthew E. Brown, Portland, OR (US)

(73) Assignee: VCVC III LLC, Seattle, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/479,094

(22) Filed: Sep. 5, 2014

(65) Prior Publication Data
US 2015/0310104 A1    Oct. 29, 2015

Related U.S. Application Data

(63) Continuation of application No. 11/601,612, filed on Nov. 16, 2006, now Pat. No. 8,856,096.

(60) Provisional application No. 60/737,446, filed on Nov. 16, 2005.

(51) Int. Cl.
*G06F 17/30* (2006.01)
*G06F 7/00* (2006.01)

(52) U.S. Cl.
CPC .... *G06F 17/30864* (2013.01); *G06F 17/30011* (2013.01); *G06F 17/30684* (2013.01); *G06F 17/30731* (2013.01)

(58) Field of Classification Search
None
See application file for complete search history.

(56) References Cited

U.S. PATENT DOCUMENTS

| 4,839,853 A | 6/1989 | Deerwester et al. ......... 364/900 |
| 5,301,109 A | 4/1994 | Landauer et al. ........ 364/419.19 |

(Continued)

FOREIGN PATENT DOCUMENTS

| EP | 0 280 866 | 9/1988 |
| EP | 0 597 630 | 5/1994 |

(Continued)

OTHER PUBLICATIONS

Abraham, "FoXQ—Xquery by Forms," Human Centric Computing Languages and Environments, IEEE Symposium, Oct. 28-31, 2003, Piscataway, New Jersey, pp. 289-290.

(Continued)

*Primary Examiner* — Alicia Willoughby
(74) *Attorney, Agent, or Firm* — Ellen M. Bierman; Lowe Graham Jones PLLC

(57) ABSTRACT

Methods and systems for extending keyword searching techniques to syntactically and semantically annotated data are provided. Example embodiments provide a Syntactic Query Engine ("SQE") that parses, indexes, and stores a data set as an enhanced document index with document terms as well as information pertaining to the grammatical roles of the terms and ontological and other semantic information. In one embodiment, the enhanced document index is a form of term-clause index, that indexes terms and syntactic and semantic annotations at the clause level. The enhanced document index permits the use of a traditional keyword search engine to process relationship queries as well as to process standard document level keyword searches. This abstract is provided to comply with rules requiring an abstract, and it is submitted with the intention that it will not be used to interpret or limit the scope or meaning of the claims.

22 Claims, 31 Drawing Sheets

(56) References Cited

U.S. PATENT DOCUMENTS

| | | | | |
|---|---|---|---|---|
| 5,317,507 | A | 5/1994 | Gallant | 364/419.13 |
| 5,325,298 | A | 6/1994 | Gallant | 364/419.19 |
| 5,331,556 | A | 7/1994 | Black, Jr. et al. | 364/419.08 |
| 5,377,103 | A | 12/1994 | Lamberti et al. | 364/419.08 |
| 5,619,709 | A | 4/1997 | Caid et al. | 395/794 |
| 5,634,051 | A | 5/1997 | Thomson | 395/605 |
| 5,778,362 | A | 7/1998 | Deerwester | 707/5 |
| 5,794,050 | A | 8/1998 | Dahlgren et al. | 395/708 |
| 5,794,178 | A | 8/1998 | Caid et al. | 704/9 |
| 5,799,268 | A | 8/1998 | Boguraev | 704/9 |
| 5,848,417 | A | 12/1998 | Shoji et al. | 707/102 |
| 5,857,179 | A | 1/1999 | Vaithyanathan et al. | 707/2 |
| 5,884,302 | A | 3/1999 | Ho | 707/3 |
| 5,933,822 | A | 8/1999 | Braden Harder et al. | 707/5 |
| 5,950,189 | A | 9/1999 | Cohen et al. | 707/3 |
| 5,982,370 | A | 11/1999 | Kamper | 345/356 |
| 6,006,221 | A | 12/1999 | Liddy et al. | 707/5 |
| 6,006,225 | A * | 12/1999 | Bowman et al. | |
| 6,026,388 | A | 2/2000 | Liddy et al. | 707/1 |
| 6,061,675 | A | 5/2000 | Wical | 706/45 |
| 6,064,951 | A | 5/2000 | Park et al. | 704/8 |
| 6,122,647 | A | 9/2000 | Horowitz et al. | 707/513 |
| 6,167,368 | A | 12/2000 | Wacholder | 704/9 |
| 6,178,416 | B1 | 1/2001 | Thompson et al. | 707/3 |
| 6,192,360 | B1 | 2/2001 | Dumais et al. | 707/6 |
| 6,202,064 | B1 | 3/2001 | Julliard | 707/5 |
| 6,219,664 | B1 | 4/2001 | Watanabe | 707/3 |
| 6,246,977 | B1 | 6/2001 | Messerly et al. | 704/9 |
| 6,363,373 | B1 | 3/2002 | Steinkraus | 707/3 |
| 6,405,190 | B1 | 6/2002 | Conklin | 707/3 |
| 6,411,962 | B1 | 6/2002 | Kupiec | 707/102 |
| 6,460,029 | B1 | 10/2002 | Fries et al. | 707/3 |
| 6,484,162 | B1 | 11/2002 | Edlund et al. | 707/3 |
| 6,510,406 | B1 | 1/2003 | Marchisio | 704/9 |
| 6,584,464 | B1 | 6/2003 | Warthen | 707/4 |
| 6,601,026 | B2 | 7/2003 | Appelt et al. | 704/9 |
| 6,728,707 | B1 | 4/2004 | Wakefield et al. | 707/5 |
| 6,732,097 | B1 | 5/2004 | Wakefield et al. | 707/5 |
| 6,732,098 | B1 | 5/2004 | Wakefield et al. | 707/5 |
| 6,738,765 | B1 | 5/2004 | Wakefield et al. | 707/5 |
| 6,741,988 | B1 | 5/2004 | Wakefield et al. | 707/7 |
| 6,745,161 | B1 | 6/2004 | Arnold et al. | 704/7 |
| 6,757,646 | B2 | 6/2004 | Marchisio | 704/8 |
| 6,859,800 | B1 | 2/2005 | Roche et al. | 707/3 |
| 6,862,710 | B1 | 3/2005 | Marchisio | 715/501.1 |
| 6,904,433 | B2 | 6/2005 | Kapitskaia et al. | 707/10 |
| 6,910,003 | B1 | 6/2005 | Arnold et al. | 704/4 |
| 6,996,575 | B2 | 2/2006 | Cox et al. | 707/102 |
| 7,051,017 | B2 | 5/2006 | Marchisio | 707/3 |
| 7,054,854 | B1 | 5/2006 | Hattori et al. | 707/3 |
| 7,171,349 | B1 | 1/2007 | Wakefield et al. | 704/9 |
| 7,283,951 | B2 | 10/2007 | Marchisio et al. | 704/9 |
| 7,398,201 | B2 | 7/2008 | Marchisio et al. | 704/9 |
| 7,403,938 | B2 | 7/2008 | Harrison et al. | 707/3 |
| 7,451,135 | B2 | 11/2008 | Goldman et al. | 707/3 |
| 7,526,425 | B2 | 4/2009 | Marchisio et al. | 704/9 |
| 7,752,200 | B2 | 7/2010 | Scholl et al. | 707/730 |
| 7,788,084 | B2 | 8/2010 | Brun et al. | 704/7 |
| 8,122,016 | B1 | 2/2012 | Lamba et al. | 707/723 |
| 8,666,909 | B2 | 3/2014 | Pinckney et al. | 706/11 |
| 2002/0007267 | A1 | 1/2002 | Batchilo et al. | 704/9 |
| 2002/0010574 | A1 | 1/2002 | Tsourikov et al. | 704/9 |
| 2002/0022956 | A1 | 2/2002 | Ukrainczyk et al. | 704/9 |
| 2002/0059161 | A1 | 5/2002 | Li | 707/1 |
| 2002/0078041 | A1 * | 6/2002 | Wu | 707/4 |
| 2002/0078045 | A1 | 6/2002 | Dutta | 707/7 |
| 2002/0091671 | A1 | 7/2002 | Prokoph | 707/1 |
| 2002/0103789 | A1 | 8/2002 | Turnbull et al. | 707/3 |
| 2002/0120651 | A1 | 8/2002 | Pustejovsky et al. | 707/513 |
| 2003/0004716 | A1 | 1/2003 | Haigh et al. | 704/238 |
| 2003/0101182 | A1 | 5/2003 | Govrin et al. | 707/7 |
| 2003/0115065 | A1 | 6/2003 | Kakivaya et al. | 704/270.1 |
| 2003/0115191 | A1 | 6/2003 | Copperman et al. | 707/3 |
| 2003/0191626 | A1 | 10/2003 | Al-Onzian et al. | 704/8 |
| 2003/0233224 | A1 | 12/2003 | Marchisio et al. | 704/4 |
| 2004/0010508 | A1 | 1/2004 | Fest et al. | 707/102 |
| 2004/0125877 | A1 | 7/2004 | Chang et al. | 375/240.28 |
| 2004/0167870 | A1 | 8/2004 | Wakefield et al. | 707/1 |
| 2004/0167883 | A1 | 8/2004 | Wakefield et al. | 707/3 |
| 2004/0167884 | A1 | 8/2004 | Wakefield et al. | 707/3 |
| 2004/0167885 | A1 | 8/2004 | Wakefield et al. | 707/3 |
| 2004/0167886 | A1 | 8/2004 | Wakefield et al. | 707/3 |
| 2004/0167887 | A1 | 8/2004 | Wakefield et al. | 707/3 |
| 2004/0167907 | A1 | 8/2004 | Wakefield et al. | 707/100 |
| 2004/0167908 | A1 | 8/2004 | Wakefield et al. | 707/100 |
| 2004/0167909 | A1 | 8/2004 | Wakefield et al. | 707/100 |
| 2004/0167910 | A1 | 8/2004 | Wakefield et al. | 707/100 |
| 2004/0167911 | A1 | 8/2004 | Wakefield et al. | 707/100 |
| 2004/0221235 | A1 * | 11/2004 | Marchisio et al. | 715/534 |
| 2004/0243388 | A1 | 12/2004 | Corman et al. | 704/1 |
| 2005/0027704 | A1 | 2/2005 | Hammond et al. | 707/5 |
| 2005/0076365 | A1 | 4/2005 | Popov et al. | 725/46 |
| 2005/0108001 | A1 | 5/2005 | Aarskog | 704/10 |
| 2005/0138018 | A1 | 6/2005 | Sakai et al. | 707/3 |
| 2005/0149494 | A1 | 7/2005 | Lindh et al. | 707/3 |
| 2005/0197828 | A1 | 9/2005 | McConnell et al. | 704/9 |
| 2005/0210000 | A1 | 9/2005 | Michard | 707/3 |
| 2005/0267871 | A1 | 12/2005 | Marchisio et al. | 707/3 |
| 2006/0149734 | A1 * | 7/2006 | Egnor et al. | 707/7 |
| 2006/0224565 | A1 | 10/2006 | Ashutosh et al. | 707/3 |
| 2006/0279799 | A1 | 12/2006 | Goldman | 358/403 |
| 2007/0136326 | A1 | 6/2007 | McClement et al. | 707/100 |
| 2007/0156669 | A1 | 7/2007 | Marchisio et al. | 707/4 |
| 2007/0233656 | A1 | 10/2007 | Bunescu et al. | 707/3 |
| 2008/0005651 | A1 | 1/2008 | Grefenstette et al. | 715/500 |
| 2008/0059456 | A1 * | 3/2008 | Chowdhury et al. | 707/5 |
| 2008/0097975 | A1 | 4/2008 | Guay et al. | 704/4 |
| 2008/0208864 | A1 | 8/2008 | Cucerzan et al. | 707/8 |
| 2008/0228720 | A1 | 9/2008 | Mukherjee et al. | 707/3 |
| 2008/0235203 | A1 | 9/2008 | Case et al. | 707/5 |
| 2009/0144609 | A1 | 6/2009 | Liang et al. | 715/230 |
| 2009/0187467 | A1 | 7/2009 | Fang et al. | 705/10 |
| 2009/0248678 | A1 | 10/2009 | Okamoto | 707/5 |
| 2010/0010994 | A1 | 1/2010 | Wittig et al. | 707/6 |
| 2010/0299326 | A1 | 11/2010 | Germaise | 707/728 |
| 2010/0306251 | A1 | 12/2010 | Snell | 707/769 |
| 2011/0112995 | A1 | 5/2011 | Chang et al. | 706/12 |
| 2013/0124510 | A1 | 5/2013 | Guha | 707/723 |

FOREIGN PATENT DOCUMENTS

| | | |
|---|---|---|
| WO | 00/14651 | 3/2000 |
| WO | 00/57302 | 9/2000 |
| WO | 01/22280 | 3/2001 |
| WO | 01/80177 | 10/2001 |
| WO | 02/27536 | 4/2002 |
| WO | 02/33583 | 4/2002 |
| WO | 2004/053645 | 6/2004 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knoweldge Discovery*, Nantes, France, 1998, pp. 1-9.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations 7(1):67-75, Jun. 2005.

(56) References Cited

OTHER PUBLICATIONS

Littman et al., "Automatic Cross-Language Information Retrieval Using Latent Semantic Indexing," *in Grefenstette, G. editor*, Cross Language Information Retrieval. Kluwer, 1998, pp. 1-11.

Nagao et al., "Semantic Annotation and Transcoding: Making Web Content More Accessible," *IEEE Multimedia, IEEE Computer Society*, US, 8(2):69-81, Apr. 2001.

Nguyen et al., "Accessing Relational Databases from the World Wide Web," SIGMOD Record ACM USA, Jun. 1996, vol. 25, No. 2, pp. 529-540.

Pohlmann et al., "The Effect of Syntactic Phrase Indexing on Retrieval Performance for Dutch Texts," *Proceedings of RIAO*, pp. 176-187, Jun. 1997.

Sneiders, "Automated Question Answering Using Question Templates That Cover the Conceptual Model of the Database," *Natural Language Processing and Information Systems, 6th International Conference on Applications of Natural Language to Information Systems*, Revised Papers (Lecture Notes in Computer Science vol. 2553) Springer-Verlag Berlin, Germany, 2002 vol. 2553, pp. 235-239.

* cited by examiner

Step 1: Specify columns — 1001

| Column | Column data |
|---|---|
| 1 | Source — 1002 |
| 2 | Action — 1003 |
| 3 | Target — 1004 |
| 4 | Prepositional_Phrase — 1005 |
| 5 | Date_Published — 1006 |
| 6 | Creator_Country — 1007 |

Each row has a Remove button.

Preview (tab delimited): — 1009

```
Hikari Tsushin Inc buy         Softmap Co Ltd    3.00E9 yen   Mon Jul 28 00:00:00 PDT 1997                             JAPAN
INTEL CORP       acquire       Nasdaq            $3.50        Mon Jul 28 00:00:00 PDT 1997         USA
INTEL CORP       acquire       Nasdaq            $17.50                                            USA
Chartwell Group Inc            acquire           Computer Integration Corp      $1.13              Fri Jul 25 00:00:00 PDT 1997   USA
ThermoTrex Corp  acquire       Computer Communications Specialists Inc  $1.85E8  Mon Jul 21 00:00:00 PDT 1997   USA
SUNOCO INC       buy           Encore Computer Corp.            $1.85E8   Fri Jul 18 00:00:00 PDT 1997           USA
SUNOCO INC       acquire       Encore Computer Corp.            $1.85E8   Fri Jul 18 00:00:00 PDT 1997           USA
SUNOCO INC       acquire       Encore Computer Corp.            $1.85E8   Fri Jul 18 00:00:00 PDT 1997           USA
SUNOCO INC       acquire       Encore Computer Corp             $1.85E8   Fri Jul 18 00:00:00 PDT 1997           USA
SUN MICROSYSTEMS INC  buy      Encore Computer Corp                       Thu Jul 17 00:00:00 PDT 1997           USA
```

1008 — Add Column    1010 — Export Data

EXTENDING KEYWORD SEARCHING TO SYNTACTICALLY AND SEMANTICALLY ANNOTATED DATA

CROSS-REFERENCE TO RELATED APPLICATIONS

This application is a continuation of U.S. application Ser. No. 11/601,612, filed Nov. 16, 2006, entitled "EXTENDING KEYWORD SEARCHING TO SYNTACTICALLY AND SEMANTICALLY ANNOTATED DATA," which claims the benefit of U.S. Provisional Application No. 60/737,446, filed Nov. 16, 2005, entitled "METHOD AND SYSTEM FOR EXTENDING KEYWORD SEARCHING TO SYNTACTICALLY AND SEMANTICALLY ANNOTATED DATA," both of which are incorporated herein by reference in their entireties.

STATEMENT REGARDING FEDERALLY SPONSORED RESEARCH OR DEVELOPMENT

This invention was made with government support under Contract No. DAAH01-00-C-R168, awarded by Defense Advanced Research Project Agency; Contract Nos. W74Z8H-04-P-0104 and W74V8H-05-C-0016, awarded by the Office of the Secretary of Defense, U.S. Army; and Contract No. FA8650-05-C-6500, awarded by the Office of the Secretary of Defense, U.S. Air Force. The government has or may have certain rights in this invention.

TECHNICAL FIELD

The present invention relates to methods, systems, and techniques for searching for information in a data set, and, in particular, to enhanced methods, systems, and techniques for syntactically indexing and performing syntactic searching of data sets using relationship queries to achieve greater search result accuracy.

BACKGROUND

Often times it is desirable to search large sets of data, such as collections of millions of documents, only some of which may pertain to the information being sought. In such instances it is difficult to either identify a subset of data to search or to search all data yet return only meaningful results. The techniques that have been traditionally applied to support searching large sets of data have fallen short of expectations, because they have not been able to achieve a high degree of accuracy of search results due to inherent limitations.

One common technique, implemented by traditional keyword search engines, matches words expected to found in a set of documents through pattern matching techniques. Thus, the more that is known in advance about the documents including their content, format, layout, etc., the better the search terms that can be provided to elicit a more accurate result. Data is searched and results are generated based on matching one or more words or terms that are designated as a query. Results such as documents are returned when they contain a word or term that matches all or a portion of one or more keywords that were submitted to the search engine as the query. Some keyword search engines additionally support the use of modifiers, operators, or a control language that specifies how the keywords should be combined when performing a search. For example, a query might specify a date filter to be used to filter the returned results. In many traditional keyword search engines, the results are returned ordered, based on the number of matches found within the data. For example, a keyword search against Internet websites typically returns a list of sites that contain one or more of the submitted keywords, with the sites with the most matches appearing at the top of the list. Accuracy of search results in these systems is thus presumed to be associated with frequency of occurrence.

One drawback to traditional keyword search engines is that they do not return data that fails to match the submitted keywords, even though the data may be relevant. For example, if a user is searching for information on what products a particular country imports, data that refers to the country as a "customer" instead of using the term "import" would be missed if the submitted query specifies "import" as one of the keywords, but doesn't specify the term "customer." For example, a sentence such as "Argentina has been the main customer for Bolivia's natural gas" would be missed, because no forms of the word "import" are present in the sentence. Ideally, a user would be able to submit a query and receive back a set of results that were accurate based on the meaning of the query—not just on the specific keywords used in submitting in the query.

Natural language parsing provides technology that attempts to understand and identify the syntactical structure of a language. Natural language parsers ("NLPs") have been used to identify the parts of speech of each term in a submitted sentence to support the use of sentences as natural language queries against data. However, systems that have used NLPs to parse and process queries against data, even when the data is highly structured, suffer from severe performance problems and extensive storage requirements.

Natural language parsing techniques have also been applied to extracting and indexing information from large corpora of documents. By their nature, such systems are incredibly inefficient in that they require excessive storage and intensive computer processing power. The ultimate challenge with such systems has been to find solutions to reduce these inefficiencies in order to create viable consumer products. Several systems have taken an approach to reducing inefficiencies by subsetting the amount of information that is extracted and subsequently retained as structured data (that is only extracting a portion of the available information). For example, NLPs have been used with Information Extraction engines that extract particular information from documents that follow predetermined grammar rules or when a predefined term or rule is recognized, hoping to capture and provide a structured view of potentially relevant information for the kind of searches that are expected on that particular corpus. Such systems typically identify text sentences in a document that follow a particular part-of-speech pattern or other patterns inherent in the document domain, such as "trigger" terms that are expected to appear when particular types of events are present. The trigger terms serve as "triggers" for detecting such events. Other systems may use other formulations for specified patterns to be recognized in the data set, such as predefined sets of events or other types of descriptions of events or relationships based upon predefined rules, templates, etc. that identify the information to be extracted. However, these techniques may fall short of being able to produce meaningful results when the documents do not follow the specified patterns or when the rules or templates are difficult to generate. The probability of a sentence falling into a class of predefined sentence templates or the probability of a phrase occurring literally is sometimes too low to produce the desired level of recall. Failure to account for semantic and syntactic variations across a data set, especially heterogeneous data sets, has led to inconsistent results in some situations.

BRIEF DESCRIPTION OF THE DRAWINGS

FIG. 1 shows a relationship query and the results returned by an example embodiment of the INFACT® 3.1 search engine product.

FIG. 7 is an example screen display illustrating how a user exports search result data.

FIG. 9 is an example screen display of an interface for exporting search result data to a data frame.

FIG. 10 is an example screen display of a visual interface for specifying attributes of a data frame for export.

FIG. 11 is an example screen display of a data frame once exported into another application.

FIG. 13 is an example screen display of the results of the query specified in FIG. 12.

FIG. 16 is an example screen display of the results provided upon selection of a second navigation tip according to the first embodiment.

FIG. 19 is an example screen display of results determined when a user selects a deep navigation tip.

DETAILED DESCRIPTION

Figure 2:
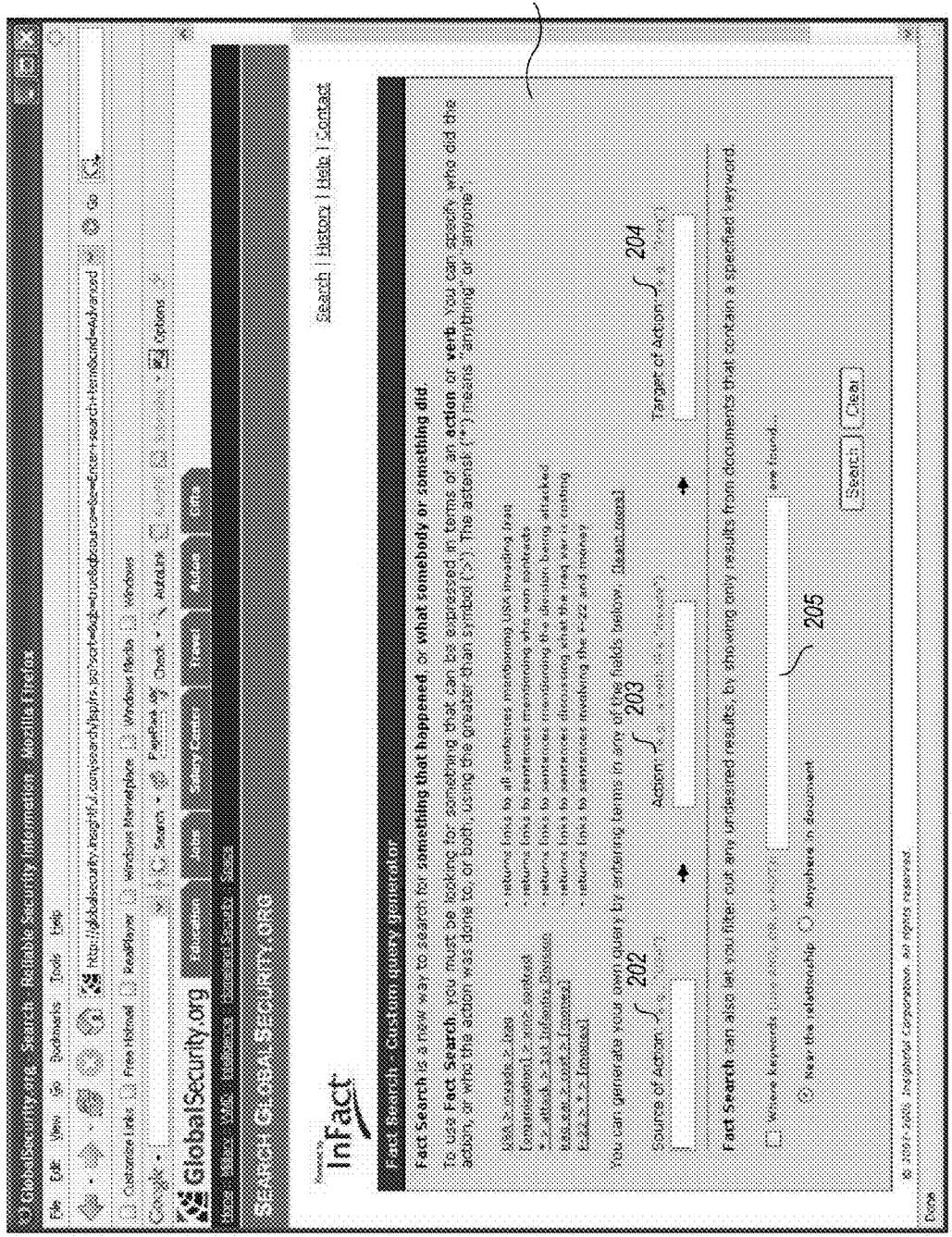
FIG. 2 is an example screen display of a custom relationship or event query generator for a website.

It is often desirable to search large sets of unstructured data, such as collections of millions of documents, only some of which may pertain to the information being sought. Traditional search engines approach such data mining typically by offering interactive searches that match the data to one or more keywords (terms) using classical pattern matching or string matching techniques. At the other extreme, information extraction engines typically approach the unstructured data mining problem by extracting subsets of the data, based upon formulations of predefined rules, and then converting the extracted data into structured data that can be more easily searched. Typically, the extracted structured data is stored in a relational database management system and accessed by database languages and tools. Other techniques, such as those offered by Insightful Corporation's INFACT® search engine products, offer greater accuracy and truer information discovery tools, because they employ generalized syntactic indexing with the ability to interactively search for relationships and events in the data, including latent relationships, across the entire data set and not just upon predetermined extracted data that follows particular syntactic patterns. INFACT® search engine product's syntactic indexing and relationship searching uses natural language parsing techniques to grammatically analyze sentences to attempt to understand the meaning of sentences and then applies queries in a manner that takes into account the grammatical information to locate relationships in the data that correspond to the query. Some of these embodiments support a natural language query interface, which parses natural language queries in much the same manner as the underlying data, in addition to a streamlined relationship and event searching interface that focuses on retrieving information associated with particular grammatical roles. Other interfaces for relationship and event searching can be generated using an application programming interface ("API"). Insightful Corporation's syntactic searching techniques are described in detail in U.S. Provisional Application Nos. 60/312,385, 60/620,550, and 60/737,446 and U.S. application Ser. Nos. 10/007,299, 10/371,399, and 11/012,089, which are herein incorporated by reference in their entirety.

The syntactic indexing and relationship and event searching techniques describe therein extend the use of traditional keyword search engines to relationship and event searching of data sets. In summary, the syntactic and semantic information that is gleaned from an enhanced natural language parsing process is stored in an enhanced document index, for example, a form of a term-clause matrix, that is amenable to processing by the more efficient pattern (string) matching capabilities of keyword search engines. Accordingly, traditional keyword search engines, including existing or even off-the-shelf search engines, can be utilized to discover information by pattern (or string) matching the terms of a relationship query, which are inherently associated with syntactic and semantic information, against the syntactically and semantically annotated terms of sentence clauses (of documents) stored in the enhanced document index. As another benefit, the additional capabilities of such search engines, such as the availability of Boolean operations, and other filtering tools, are automatically extended to relationship and event searching.

Relationship and event searching, also described as "syntactic searching" in U.S. Application Nos. 60/312,385, Ser. Nos. 10/007,299, 10/371,399, and 60/620,550 supports the ability to search a corpus of documents (or other objects) for places, people, or things as they relate to other places, people, or things, for example, through actions or events. Such relationships can be inferred or derived from the corpus based upon one or more "roles" that each term occupies in a clause, sentence, paragraph, document, or corpus. These roles may comprise grammatical roles, such as "subject," "object," "modifier," or "verb;" or, these roles may comprise other types of syntactic or semantic information such as an entity type of "location," "date," "organization," or "person," etc. The role of a specified term or phrase (e.g., subject, object, verb, place, person, thing, action, or event, etc.) is used as an approximation of the meaning and significance of that term in the context of the sentence (or clause). In this way, a relationship or syntactic search engine attempts to "understand" the sentence when a query is applied to the corpus by determining whether the terms in sentences or clauses of the corpus are associated with the roles specified in the pending query. For example, if a user of the search engine desires to determine all events in which "Hillary Clinton" participated in as a speaker, then the user might specify a relationship query that instructs a search engine to locate all sentences/documents in which "Hillary Clinton" is a source entity and "speak" is an action. In response, the syntactic search engine will determine and return indicators to all sentences/clauses in which "Hillary Clinton" has the role of a subject and with some form of the word "speak" (e.g., speaking, spoke) or a similar word in the role of a verb.

Figure 1:
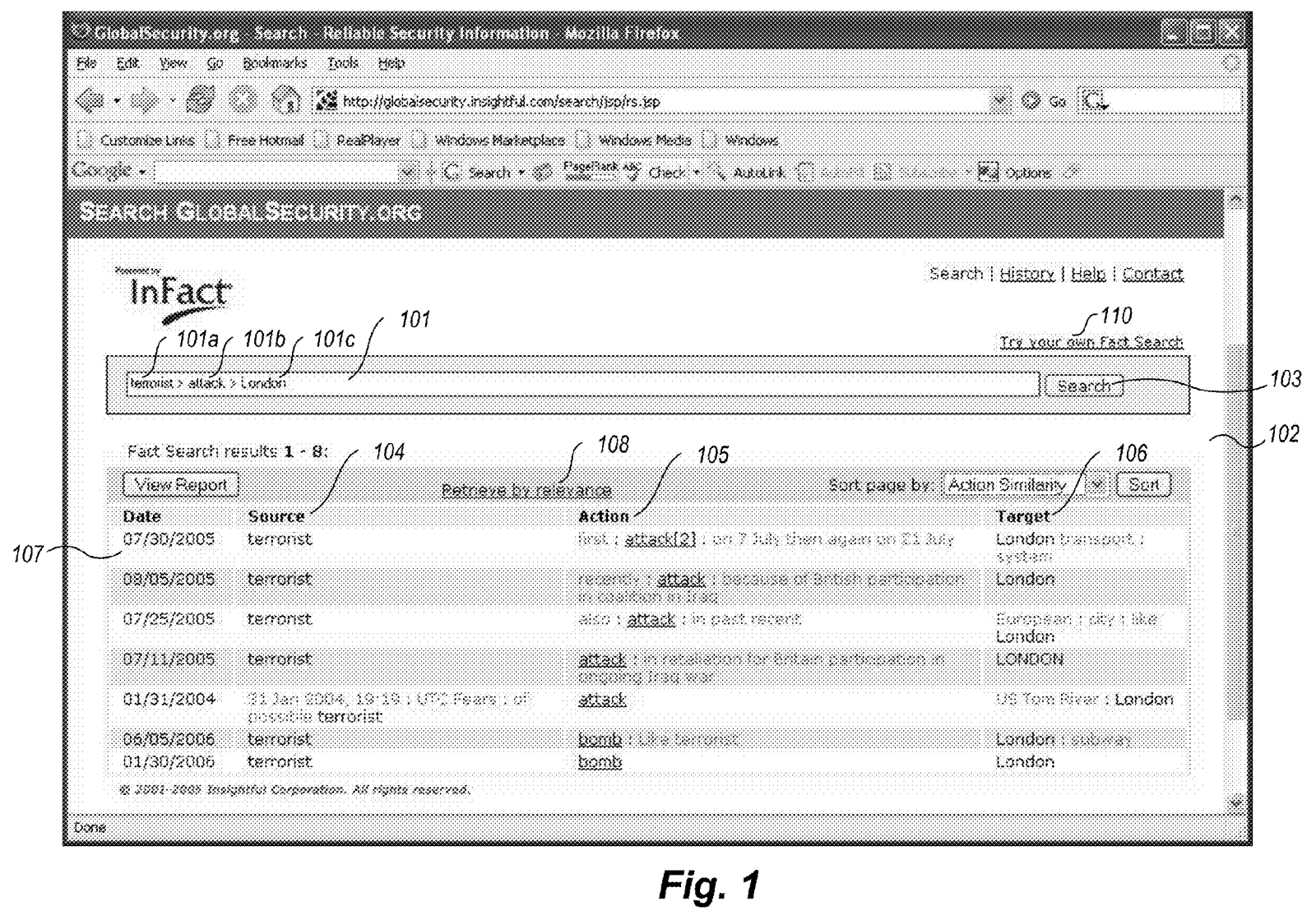

For example, FIG. 1 shows a relationship query and the results returned by an example embodiment of the INFACT® 3.1 search engine product. In the INFACT® 3.1 search engine product, a user of the search engine can specify a search, called a "Fact Search" for a known "source" or "target" entity (or both) looking for actions or events that involve that entity. The user can also specify a second entity and look for actions or events that involve both the first and second entity. The user can specify a particular action or may specify a type of action or any action. An entity specified as a source entity typically refers to the corresponding term's role as a subject (or subject-related modifier) of a clause or sentence, whereas an entity specified as a target typically refers to the corresponding term's role as an object (or object-related modifier) of a clause or sentence. An action or event typically refers to a term's role as a verb, related verb, or verb-related modifier. Moreover, instead of a specific entity, the user can specify an entity type, which refers to a tag such as an item in a classification scheme such as a taxonomy. A user can also specify a known action or action type and look for one or more entities, or entity types that are related through the specified action or action type. Many other types and combinations of relationship searches are possible and supported as described in the above-mentioned co-pending patent applications.

In the example user interface shown in FIG. 1, a relationship or event query is specified in query field 101 to. The query is entered as "terrorist>attack>London" according to Insightful Corporation's Query Language ("IQL", also known as "RQL" for Relationship Query Language), as described in detail elsewhere. The query specifies a value "terrorist" for a source entity field 101a, a value "attack" for an action field 101b, and a value "London" for a target entity field 101c. The source field 101a and target field 101c indicate whether a specified entity is to be a source of the action or a recipient (target) of the action. The directional arrows in the query specify whether action directionality for events. The particular query displayed instructs the search engine to look for sentence clauses that discuss terrorist attacks in London when the Search button 103 is pressed. The results are returned in summary information field 102, which is shown sorted by similarity to the query. Each matching relationship is shown as a row 107 in the results field 102, optionally with duplicates combined. A researcher or other user can select one of the action links in the actions column 105 to look at the document in the corpus where the relationship or event was found.

As an alternative to specifying the relationship query using IQL, the user can use a graphical/form-based interface, termed here a "query generator," for example, by selecting the "Try your own Fact Search" link 110. In response, a form such as that illustrated in FIG. 2 is presented. FIG. 2 is an example screen display of a custom relationship or event query generator for a website. The user can enter a source entity in field 102, a target (or recipient of the action) in field 104, and an action in field 103. In addition, the user can constrain the results by specifying particular keywords that need to appear. The results of the generated query are displayed similar to that shown in FIG. 1.

More details of the relationship query language and of an example user interface provided by Insightful Corporation's products are described in co-pending patent application Ser. No. 11/012,089.

Embodiments described herein provide enhancements to the methods, systems, and techniques for syntactically indexing and searching data sets to achieve more accurate search results with greater flexibility and efficiency than previously available. Example embodiments provide improvements to an enhanced Syntactic Query Engine ("SQE") that parses, indexes, and stores a data set, as well as performs syntactic searching in response to queries submitted against the data set. In one embodiment, the SQE includes, among other components, a data set repository and an Enhanced Natural Language Parser ("ENLP"). The ENLP parses each object in the data set (typically a document) and transforms it into a canonical form (also termed a normalized form) that can be searched efficiently using techniques of the present invention. To perform this transformation, the ENLP determines the syntactic structure of the data by parsing (or decomposing) each data object into syntactic units, determines the grammatical roles and relationships of the syntactic units, associates recognized entity types if configured to do so, and represents these relationships in a normalized form. The normalized data are then stored and/or indexed as appropriate for efficient searching. Thus, the SQE can provide a unified knowledge representation for both structured and unstructured data.

In example embodiments of the SQE described herein, the normalized data, including the grammatical role and other tag information that can be used to discover or explore relationships, are integrated into enhanced versions of document indexes that are typically used by traditional keyword search engines to index the terms of each document in a corpus. A traditional keyword search engine can then search the enhanced indexing information that is stored in these document indexes for matching relationships in the same manner the search engine searches for keywords. That is, the search engine looks for pattern/string matches to terms associated with the desired tag information as specified (explicitly or implicitly) in a query. A detailed description of an example SQE that provides enhanced indexing information according to these techniques is described in U.S. patent application Ser. No. 11/012,089. In one such example system, the SQE stores the relationship information that is extracted during the parsing and data object transformation process (the normalized data) in an annotated "term-clause matrix," which stores the terms of each clause along with "tagged terms," which include the syntactic and semantic information that embodies relationship information. Other example embodiments may provide different levels of organizing the enhanced indexing information, such as an annotated "term-sentence matrix" or an annotated "term-document matrix." Other variations of storage organization are possible, including that each matrix may be comprised of a plurality of other data structures or matrices.

The integration of the enhanced indexing information into traditional keyword search engine type document indexes (for example, an inverted index) is what supports the use of standard keyword search techniques to find a new type of document information—that is, relationship information—easily and quickly. An end user, such as a researcher, can pose simple Boolean style queries to the SQE yielding results that are based upon an approximation of the meaning of the indexed data objects. Because traditional search engines do not pay attention to the actual contents of the indexed information (they just perform string matching or pattern matching operations without regard to the meaning of the content), the SQE can store all kinds of relationship information in the indexed information and use a keyword search engine to quickly retrieve it. In addition, standard document searches can be combined with more specialized relationship searches to generate many types of results.

The SQE processes each query by translating or transforming the query into component keyword searches that can be performed against the indexed data set using, for example, an "off-the-shelf" or existing keyword search engine. These searches are referred to herein for ease of description as keyword searches, keyword-style searches, or pattern matching or string matching searches, to emphasize their ability to match relationship information the same way search terms can be string- or pattern-matched against a data set using a keyword search engine. The SQE then combines the results from each keyword-style search into a cohesive whole that is presented to the user.

Figure 3:
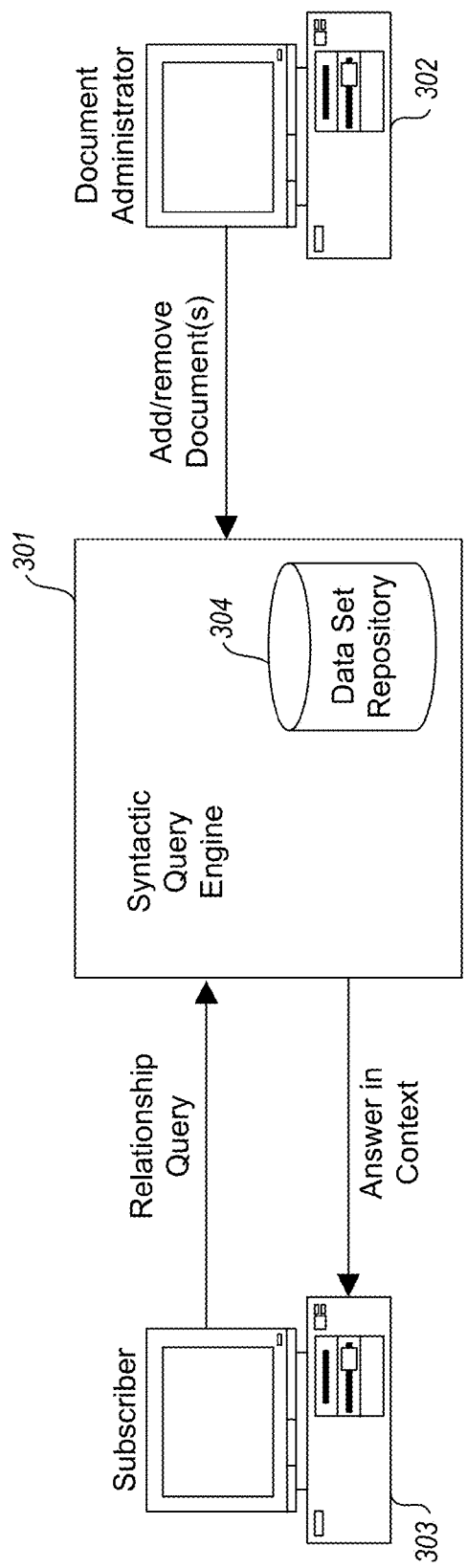
FIG. 3 is an example block diagram of an example Syntactic Query Engine.

FIG. 3 is an example block diagram of an example Syntactic Query Engine. A document administrator 302 adds and removes data sets (for example, sets of documents), which are indexed and stored within a data set repository 304 of the SQE 301. When used with keyword style searching techniques, the data set repository 304 stores an enhanced document index as described above. In the example shown in FIG. 3, a subscriber 303 to a document service submits queries to the SQE 301, perhaps using a visual interface such as a web page. The queries are then processed by the SQE 301 against the data sets indexed in the data set repository 304. The query results are then returned to the subscriber 303. In this example, the SQE 301 is shown implemented as part of a subscription document service, although one skilled in the art will recognize that the SQE may be made available in many other forms, including as a separate application/tool, integrated into other software or hardware, for example, cell phones, personal digital assistants ("PDA"), or handheld computers, or associated with other types of existing or yet to be defined services. Additionally, although the example embodiment is shown and described as processing data sets and queries that are in the English language, one skilled in the art will recognize that the SQE can be implemented to process data sets and queries in any language, or any combination of languages.

Figure 4:
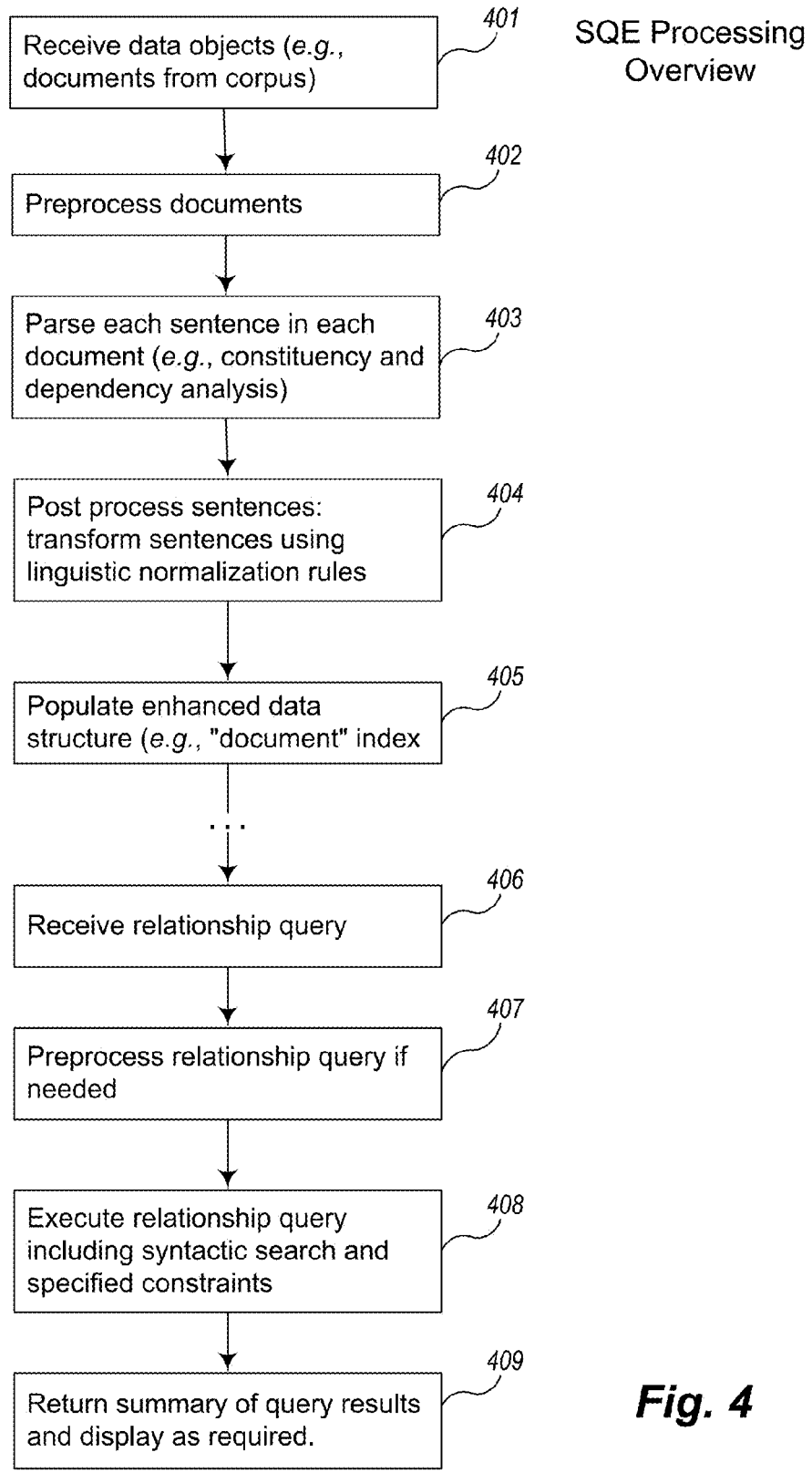
FIG. 4 is an overview of the steps performed by a Syntactic Query Engine to process data sets and relationship queries.

FIG. 4 is an overview of the steps performed by a Syntactic Query Engine to process data sets and relationship queries. Steps 401-405 address the indexing (also known as the ingestion) process, and steps 406-409 address the query process. Note that although much of the discussion herein focuses on ingestion of an entire data set prior to searching, the SQE also handles incremental document ingestion. Also, the configuration process that permits an administrator to set up ontologies, dictionaries, sizing preferences for indexes and other configuration and processing parameters is not shown.

Specifically, in step 401, the SQE receives a data set, for example, a set of documents. The documents may be received electronically, scanned in, or communicated by any reasonable means. In step 402, the SQE preprocesses the data set to ensure a consistent data format. In step 403, the SQE parses the data set, identifying entity type tags and the syntax and grammatical roles of terms within the data set as appropriate to the configured parsing level. For the purpose of extending keyword searching to syntactically and semantically annotated data, parsing sufficient to determine at least the subject, object, and verb of each clause is desirable to perform syntactic searches in relationship and event queries. However, as described elsewhere in co-pending patent applications, subsets of the capabilities of the SQE could be provided in trade for shorter corpus ingestion times if full syntactic searching is not desired. In step 404, the SQE transforms the each parsed clause (or sentence) into normalized data by applying various linguistic normalizations and transformations to map complex linguistic constructs into equivalent structures. Linguistic normalizations include lexical normalizations (e.g., synonyms), syntactic normalizations (e.g., verbalization), and semantic normalizations (e.g., reducing different sentence styles to a standard form). These heuristics and rules are applied when ingesting documents and influence how well the stored sentences eventually will be "understood" by the system. In step 405, the SQE stores the parsed and transformed sentences in a data set repository. As described above, when the SQE is used with a keyword search engine, the normalized data is stored in (used to populate) an enhanced document index such as the term-clause matrix.

After storing the data set, the SQE can process relationship queries against the data set. In step 406, the SQE receives a relationship query, for example, through a user interface such as that shown in FIG. 1. Alternatively, one skilled in the art will recognize that the query may be transmitted through a function call, batch process, or translated from some other type of interface. In step 407, if necessary (depending upon the interface) the SQE preprocesses the received relation query and transforms it into the relationship query language understood by the system. For example, if natural language queries are supported, then the natural language query is parsed into syntactic units with grammatical roles, and the relevant entity and action terms are transformed into the query language formulations understood by the SQE. In step 408, the SQE executes the received query against the data set stored in the data set repository. The SQE transforms the query internally into sub-queries as appropriate to the organization of the data in the indexes and executes a traditional keyword search engine (or its own version of keyword style searching) to process the query. In step 409, the SQE returns the results of the relationship query, for example, by displaying them through a user interface such as the summary information 102 shown in FIG. 1.

Although the techniques are described primarily with reference to text-based languages and collections of documents, similar techniques may be applied to any collection of terms, phrases, units, images, or other objects that can be represented in syntactical units and that follow a grammar that defines and assigns roles to the syntactical units, even if the data object may not traditionally be thought of in that fashion. Examples include written or spoken languages, for example, English or French, computer programming languages, graphical images, bitmaps, music, video data, and audio data. Sentences that comprise multiple words are only one example of a phrase or collection of terms that can be analyzed, indexed, and searched using the techniques described herein. One can modify the structures and program flow exemplified herein to account for differences in types of data being indexed and retrieved. The concepts and techniques described are applicable to any environment where the keyword style searching is contemplated.

Also, although certain terms are used primarily herein, one skilled in the art will recognize that other terms could be used interchangeably to yield equivalent embodiments and examples. In addition, terms may have alternate spellings which may or may not be explicitly mentioned, and one skilled in the art will recognize that all such variations of terms are intended to be included. For example, the terms "matrix" and "index" are used interchangeably and are not meant to imply a particular storage implementation. Also, a document may be a single term, clause, sentence, or paragraph or a collection of one or more such objects. Also, when referring to various data, aspects, or elements in the alternative, the term "or" is used in its plain English sense, unless otherwise specified, to mean one or more of the listed alternatives.

As additional examples, the term "query" is used herein to include any form of specifying a desired relationship query, including a specialized syntax for entering query information, a menu driven interface, a graphical interface, a natural language query, batch query processing, or any other input (including API function calls) that can be transformed into a Boolean expression of terms and annotated terms. Annotated terms are terms associated with syntactic or semantic tag information, and are equivalently referred to as "tagged terms." Semantic tags include, for example, indicators to a particular node or path in an ontology or other classification hierarchy. "Entity tags" are examples of one type of semantic tag that points, for example, to a type of ENTITY node in an ontology. In addition, although the description is oriented towards parsing and maintaining information at the clause level, it is to be understood that the SQE is able to parse and maintain information in larger units, such as sentences, paragraphs, sections, chapters, documents, etc., and the routines and data structures are modified accordingly. Thus, for ease of description, the techniques are described as they are applied to a term-clause matrix. One can equivalently apply these techniques to a term-sentence matrix or a term-document matrix.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

As described in co-pending U.S. patent application Ser. No. 11/012,089, published as U.S. Patent Publication No. 2005/0267871, many different interfaces are possible for specifying relationship queries, including form based (template-style) interfaces, relationship search strings, visual GUI drag and drop interfaces, a query language called IQL, an application programming interface ("API") for creating application access to relationship query information or for creating customized (also alternative) user interfaces etc. Appendix A, incorporated herein by reference in its entirety, describes several such interfaces and enhancements made to the SQE example embodiments that were previously described in U.S. patent application Ser. No. 11/012,089. Many of these enhancements are exemplified in Insightful Corporation's INFACT® System Release 3.1 search engine product.

Embodiments of the interfaces described in Appendix A include various enhancements to the extended keyword searching methods, systems, and techniques described herein, including, amongst other features, support for a new context operator; improved metadata searching performance, support for ontology (entity tag) searches at the document search level, an improved interface for exporting relationship data, data sorting across an entire result, and automatically generated navigation tips.

Context Operator

Embodiments of the enhanced SQE provide a context operator for determining in a relationship search whether the prescribed relation might be satisfied by searching surrounding sentences (clauses, or any other granularity desired, etc.). In some embodiments, the number of surrounding sentences/clauses searched is a predetermined number "n." In other embodiments, it is contemplated that this number can be set dynamically, even from within the query itself. Combinations and permutations (such as permitting entry of any number less than "n") are also possible.

In the user interface described in Appendix A, the context operator (also termed a context constraint) can be specified in a query as:

```
Bush > visit > [Country] AND NOT China
    PREP CONTAINS plane
    CONTEXT CONTAINS "foreign service" OR diplomat
```

In this example, a match is found if the terms "foreign service" or "diplomat" are found anywhere within one sentence (before or after) of the sentence matching the rest of the relationship specification. An abbreviated form of the context operator ("~") can also be used:

```
Bush > visit > [Country] AND NOT China
       ^plane
    ~ "foreign service" OR diplomat
```

Note that here context is defined as within a sentence. Other alternatives, such as two sentences, clauses, etc. could alternatively be defined. The same techniques can be used to provide an interface at the these levels.

The context operator is particularly beneficial to catch related text when two separate clauses (sentences) that have no inter-clause connections contain information that is related to what the researcher is searching for. For example, the sentences:

The DC-8 crashed in Japan, after two engines failed. Two hundred people were killed.

contain information about a plane crash where the number of people killed appears in a separate sentence. If one is searching to find all documents where a plane crashed injuring or killing some number of people, there are many possible ways to define a query. In one instance, suppose that the SQE defines an entity type such as "plane." Then, if the query is specified as:

Query 1: [plane]>killed>[numeric]

to avoid getting all sentences where some number of people have been killed regardless of the actor, then neither sentence above would be found. This would also be the case if the query specified "DC-8" instead of an entity type. However, by changing the query to a broader query but constrained by a context operator, such as:

Query 2: *>killed>[numeric]~[plane]

then, the second sentence above indeed will be found. Other examples abound.

Figure 12:
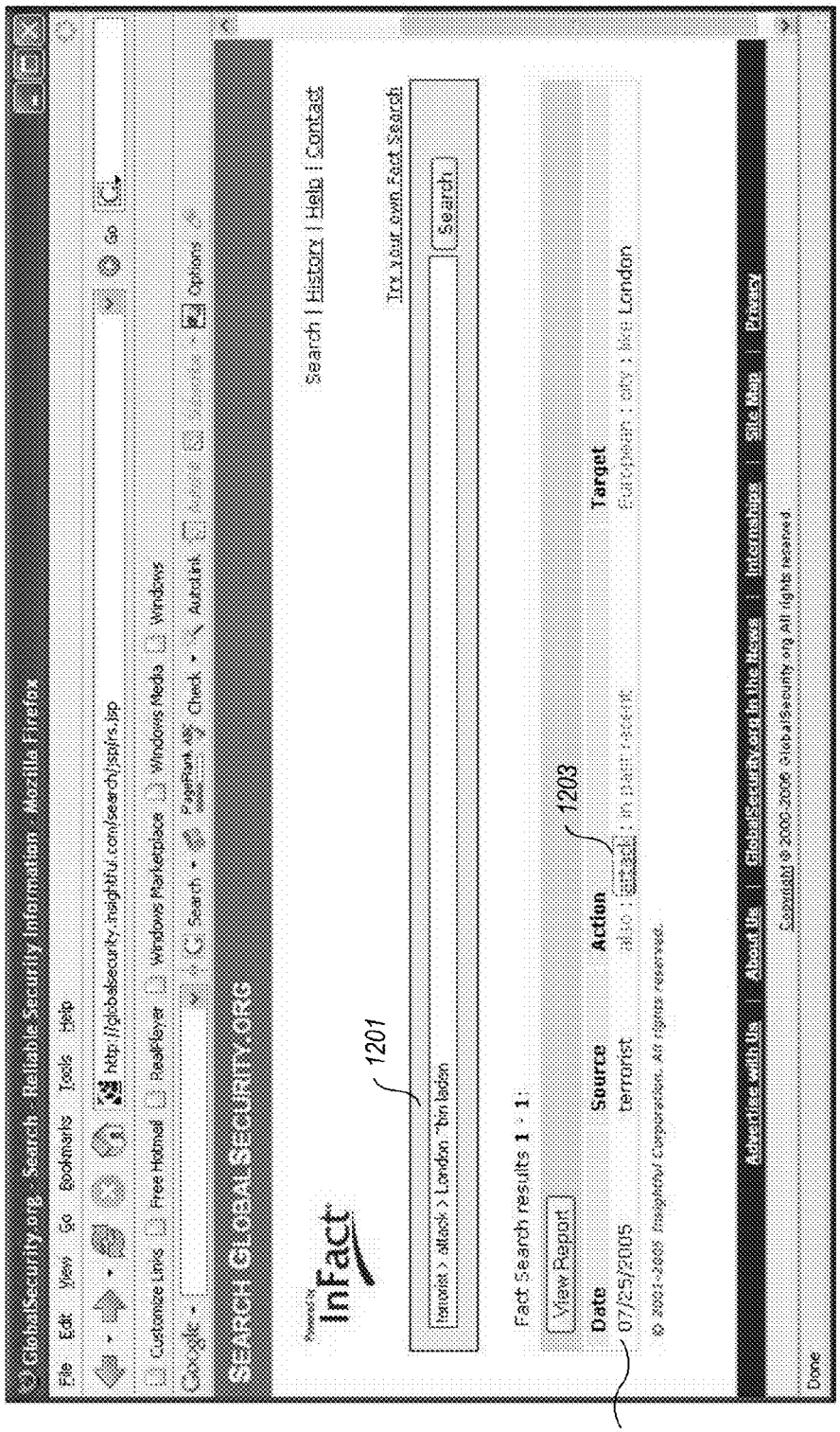
FIG. 12 is an example screen display of an interface for a relationship query that specifies a context constraint.
Figure 13:
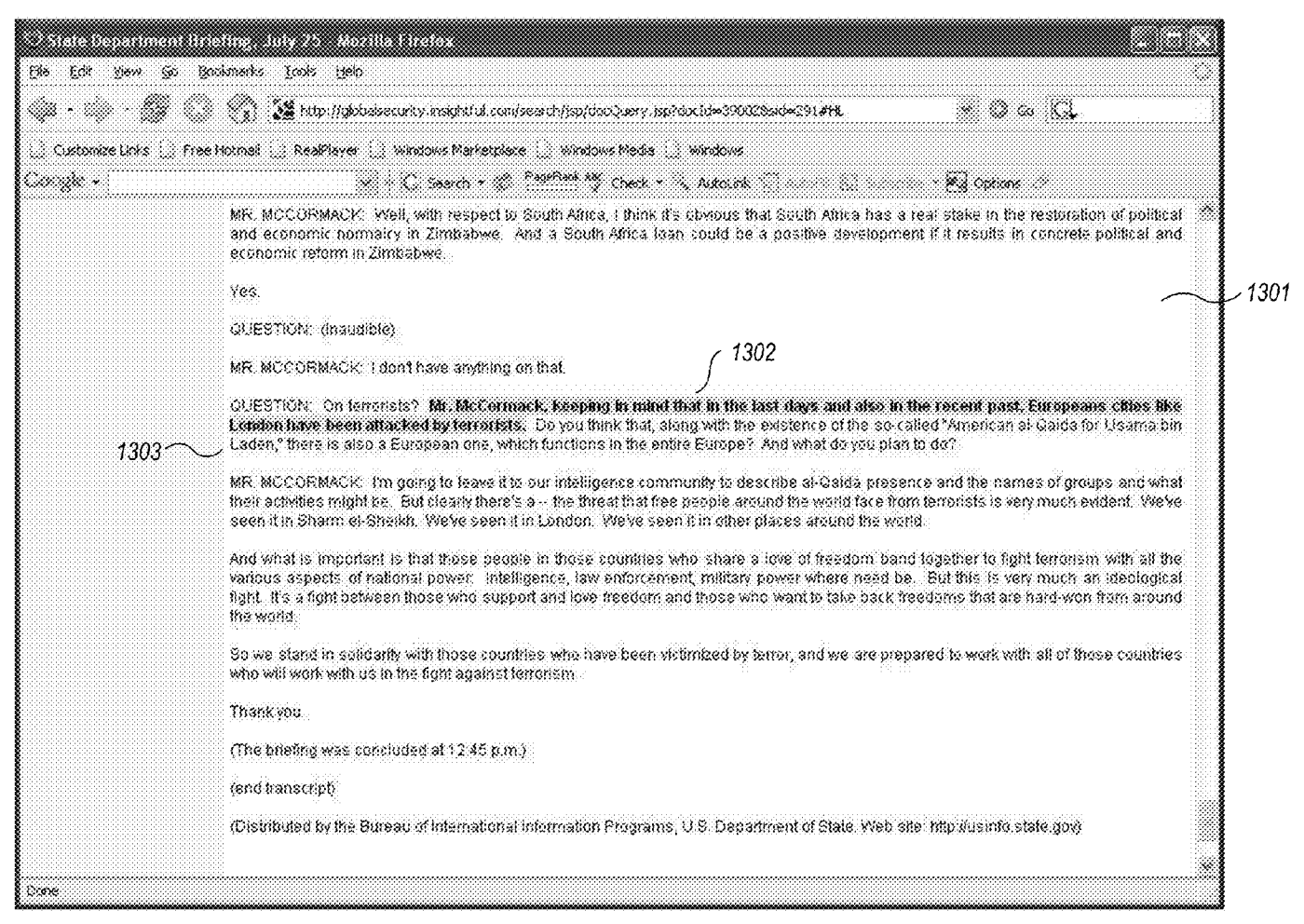

FIGS. 12 and 13 provide another example of the context operator used within the interface described in Appendix A. FIG. 12 is an example screen display of an interface for a relationship query that specifies a context constraint. In this example, the researcher is interested in finding out information regarding terrorist attacks in London where Osama Bin Laden may have been involved. Accordingly, the query entered into query entry field 1201 specifies "terrorist>attack>London~bin laden." The results of the query are shown in the result summary area 1202. To view the resulting data in context, the researcher selects the link 1203. FIG. 13 is an example screen display of the results of the query specified in FIG. 12. A portion of the corresponding document 1301 shows the matching sentence 1302 that matches the query. Note that the phrase "bin laden" 1303 appears in the context of the sentence following the matching sentence 1302. If instead of using a context operator the researcher had indicated that "bin laden" need appear somewhere in the document (for example, using the document constraint operator), many more results may have appeared where Osama Bin Laden was not necessarily discussed in the context of a London attack. Accordingly, by using the context operator, the researcher is able to discover information that may have taken searching through many results to find.

In order to support context operators, the data structures used to stored the normalized (extended keyword) data have been modified. In summary, the context, stored as a "bag of words," is stored in the term-clause index for fast access to context. In addition, since context information is now searched for surrounding sentences, the ontology paths present in the surrounding sentences (all entities) are stored for quick comparisons. See the "context" and "context_ont_path" fields in the modified term-clause index described in Table 1 below. The term-clause index and other relevant data structures were described in detail in co-pending U.S. patent application Ser. No. 11/012,089.

Metadata Constraint Performance

Embodiments of an enhanced SQE provide improved techniques for efficiently handling meta data used in relationship searches. Metadata filtering allows one to constrain a search based on document level metadata constraints. Metadata may or may not be available for a particular document corpus. (A user can determine whether such metadata is available and the various types of information available by selecting a link to the "Corpus" page as shown in Appendix A and available through some embodiments of Insightful Corporation's SQE.) For example, the following (equivalent) queries, search for all documents having at least one sentence indicating Clinton in a "visits" relationship to China, where the author of the document is "John Smith."

```
Clinton > visit > China METADATA CONTAINS Author="John
    Smith"
or
Clinton > visit > China # Author="John Smith"
```

Such a search might be useful for example, if one was searching for a book by a known author on a particular subject, buy one didn't remember the title.

In the enhanced SQE, the data structures used to stored the normalized (extended keyword) data have been modified to more efficiently store metadata, and specific metadata such as a document date, for fast retrieval. In one example embodiment, the term-document index is modified to contain additional fields such as "docdate" and "author." In some embodiments, all of the metadata is available as an inverted index as well. See also, Table 2 described below.

Ontology Specifications in Document Level Searches

Embodiments of the SQE have been enhanced to support ontology path specifications in document level searches, regardless of whether the search is performed as part of a document (i.e., keyword) search or relationship search. For example, one can search for all documents which contain a specific entity type or ontology path the same way one specifies a keyword search. For example, the general document search query:

"DC-8"

will find all documents where a "DC-8" is described somewhere in the document (including the above sentences used in the context operator example). The query can be modified by specifying a single ontology path or entity type such as:

[plane]

to achieve slightly broader results. Also, Boolean operators can be used to combine the ontology specifications in the document level search, for example:

"DC-8" AND [country] AND [person] AND NOT [money]

will find all documents that involve a DC-8, a country, and a person as long as the document doesn't contain a reference to money. This would eliminate, for example, results that describe buying a plane in China, but include results where a DC-8 killed someone in China.

One can also use relationship searches with document constraints (also called document specifications) to search for documents with a specific keyword in it. For example, the relationship search exemplified in Query 2 above can be modified to find documents where a "DC-8" is described somewhere in the document (and not just in the surrounding sentences) as:

```
* > kill > [numeric]
    DOCUMENT CONTAINS "DC-8"
or as:
    * > kill > [numeric]; "DC-8"
```

Using ontology path (or entity) document level enhancements, the above example relationship query can be modified to find killings of any number of entities happening in any country by:

*>kill>[numeric]; [country]

Other specifications are of course possible.

The data structures used to stored the normalized (extended keyword) data have been modified to efficiently support document level searches for ontology path information by including such information in specific fields in, for example, the term-document index. In one example embodiment, all ontology paths (and sub-paths) of each available entity are stored in the term-document index. See Tables 1-3 below.

Note as well that the ontologies themselves can be stored in inverted indices for easy searching and access by the SQE. Specifically, ontology entity data can be stored in keyword search engine compatible indices such as those illustrated in Appendix D, which is incorporated herein by reference in its entirety.

Data Sorting Across Entire Result

Figure 5:
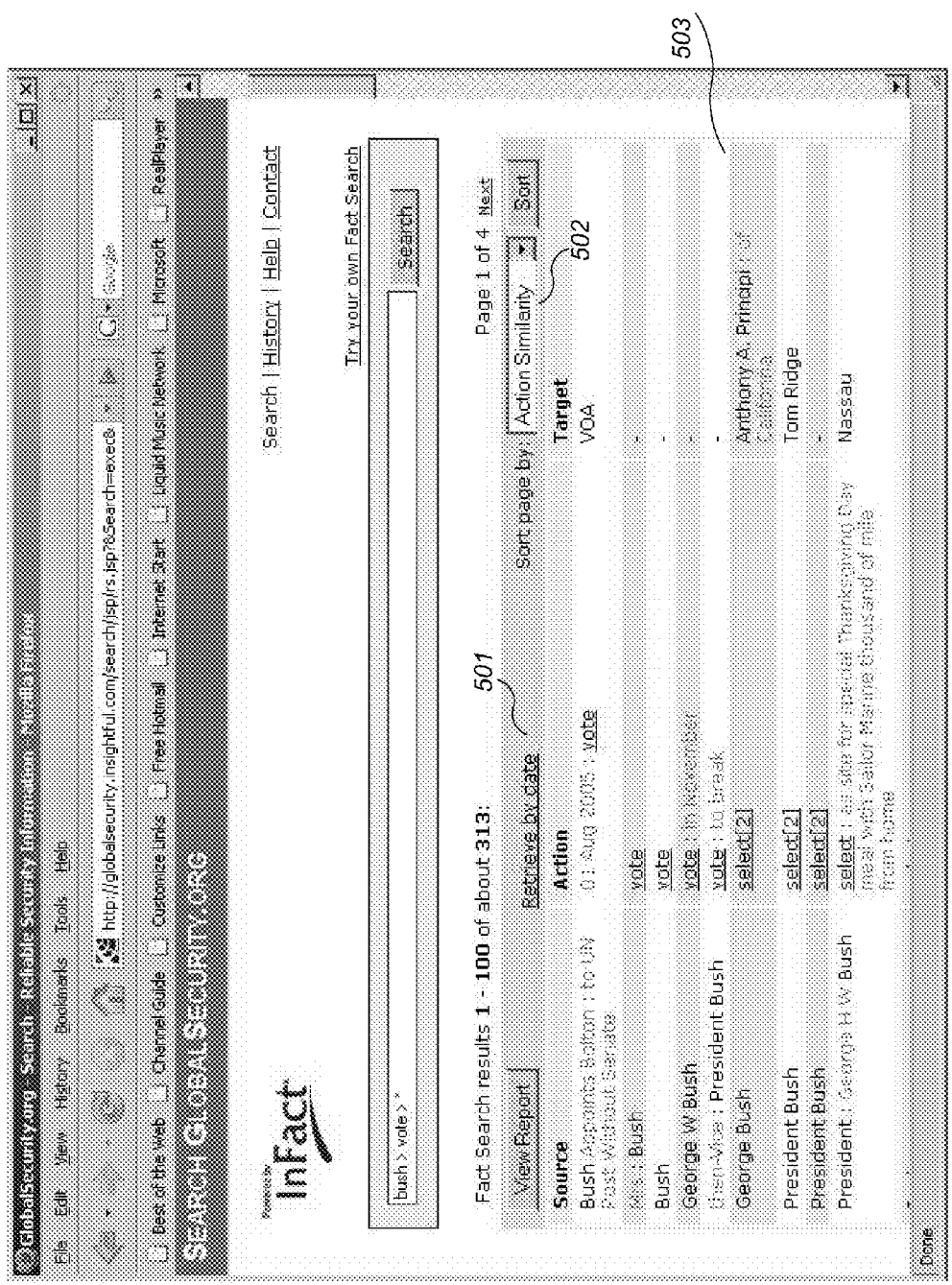
FIG. 5 is an example screen display of search results retrieved by relevance and page sorted by action similarity.

Another feature of the enhanced SQE is that it can provide search results organized by data across the whole result, and not just on a per page basis. FIG. 5 is an example screen display of search results retrieved by relevance and page sorted by action similarity. A summary of the search results is shown in summary result area 503. Because the SQE may return a large amount of results, they are brought in as data "chunks" and each page can be sorted. To sort on a per page basis, the user selects the page sort input field 502. In one embodiment, different page sorting is available depending upon the mode in which the search results are retrieved (globally across the result). In order to change the mode in which the search results are retrieved, the user selects the "retrieve by" field 501. In one embodiment, this field toggles between "retrieve by relevance" and "retrieve by date." Other modes are contemplated and could be similarly incorporated.

Figure 6:
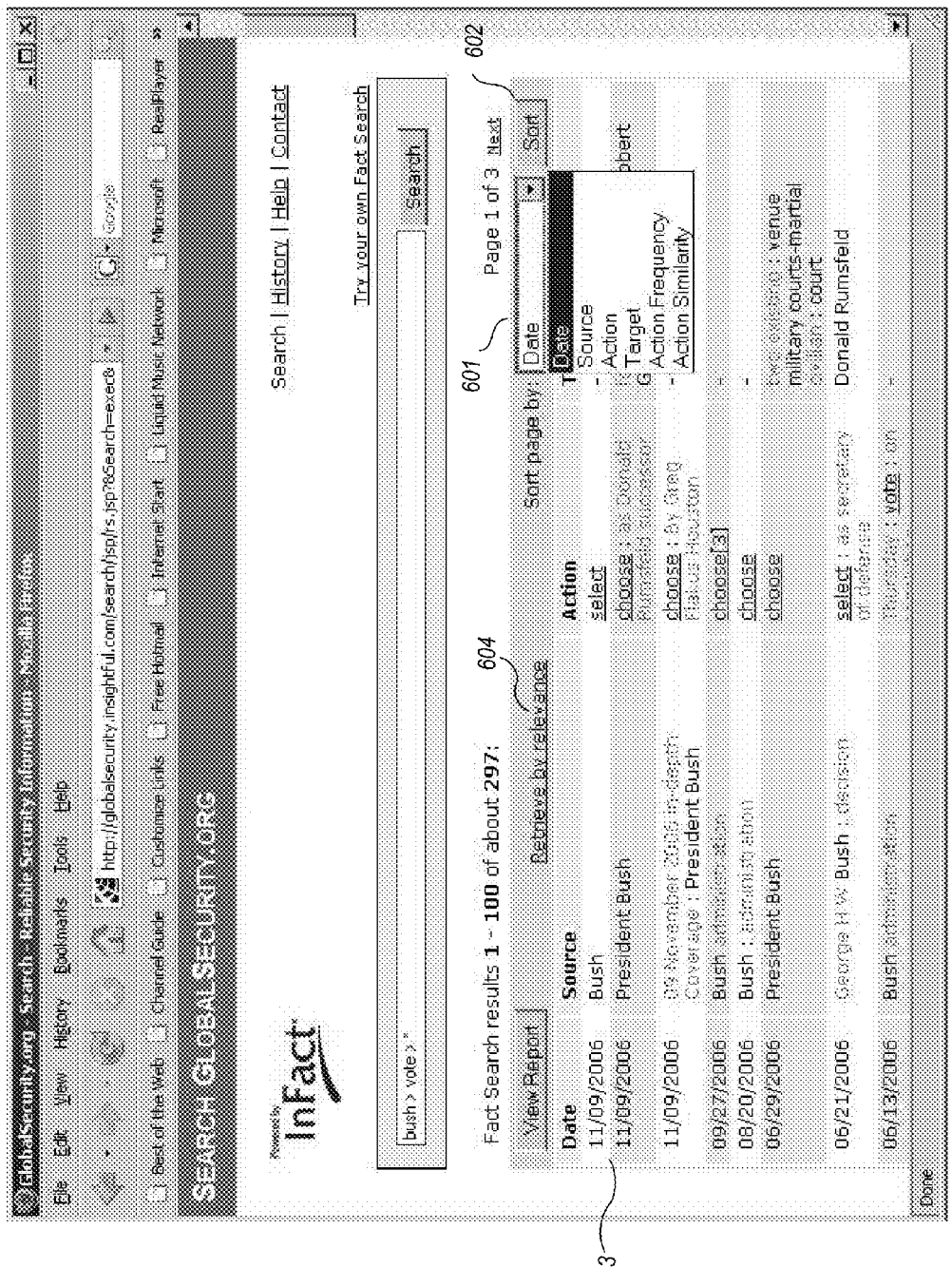
FIG. 6 is an example screen display of search results retrieved by data and page sorted by date.

When the user selects the retrieve by date field 501, the results are displayed organized by date. FIG. 6 is an example screen display of search results retrieved by data and page sorted by date. The search results are shown in summary result area 603 arranged by date. The user can change the sorting on a per page basis by selecting a different criterion in page sort input field 601 and selecting the "sort" button 602. To return to displaying the results organized by relevance, the user selects the "retrieve by relevance" toggle 604.

Exporting Relationship Data

The ability to share relationship data with other applications is useful, especially when there are large amounts of data to be analyzed and statistical tools could be applied to model the data. The enhanced SQE provides an improved interface for exporting relationship query results in a (character delimited) format that can be input to analytic tools such as those provided by S-PLUS or Excel.

Figure 7:
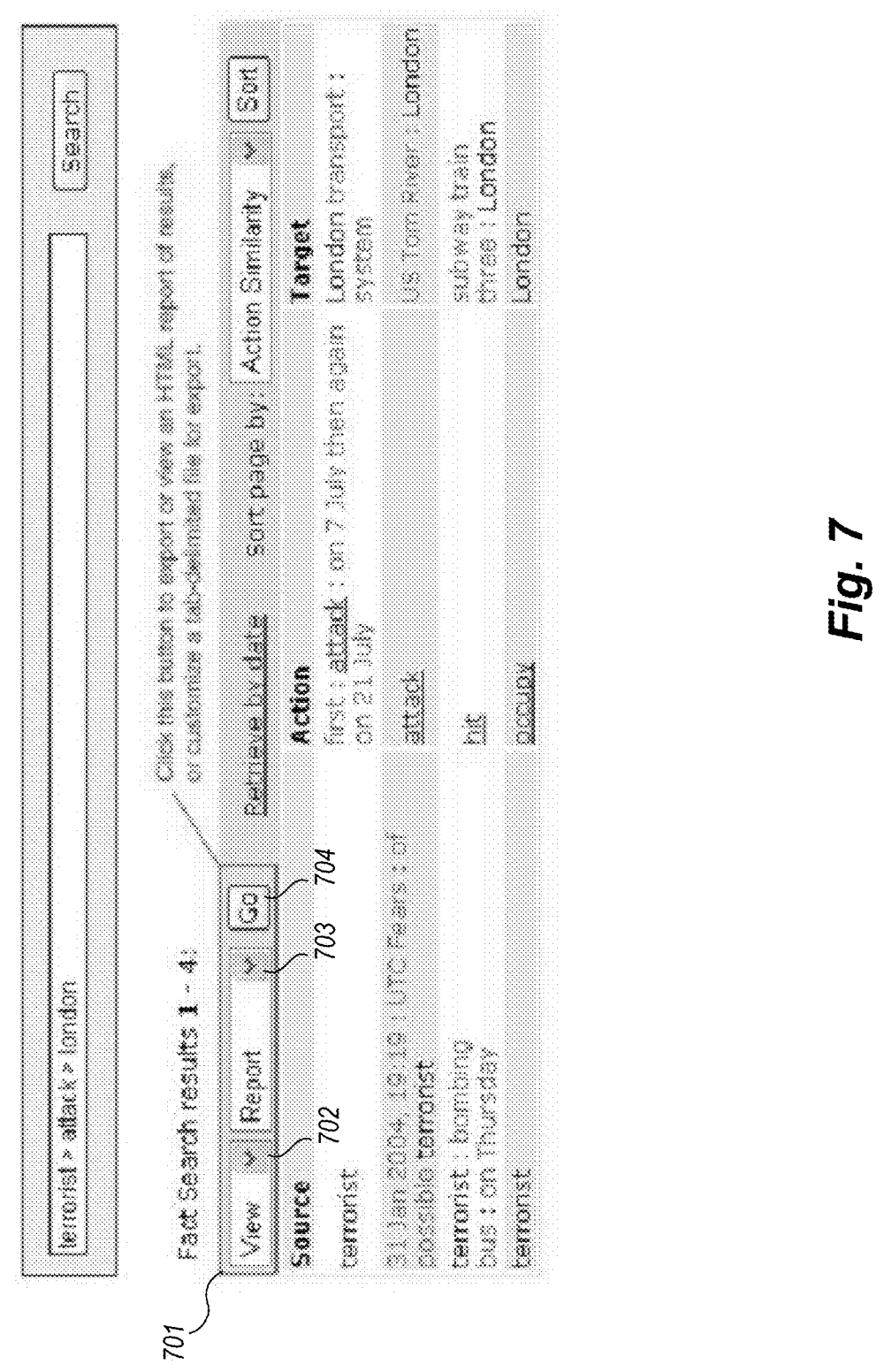

FIG. 7 is an example screen display illustrating how a user exports search result data. In FIG. 7, the SQE provides a view/export control 701 for viewing reports or tables and for exporting the same. The user selects whether to view or export via user interface ("UI") control 702. The control 703 is used to indicate whether a report or a file (table) is desired. Once the user has made these selections, the user presses the "go" button 704 to perform the view/export function.

Figure 8:
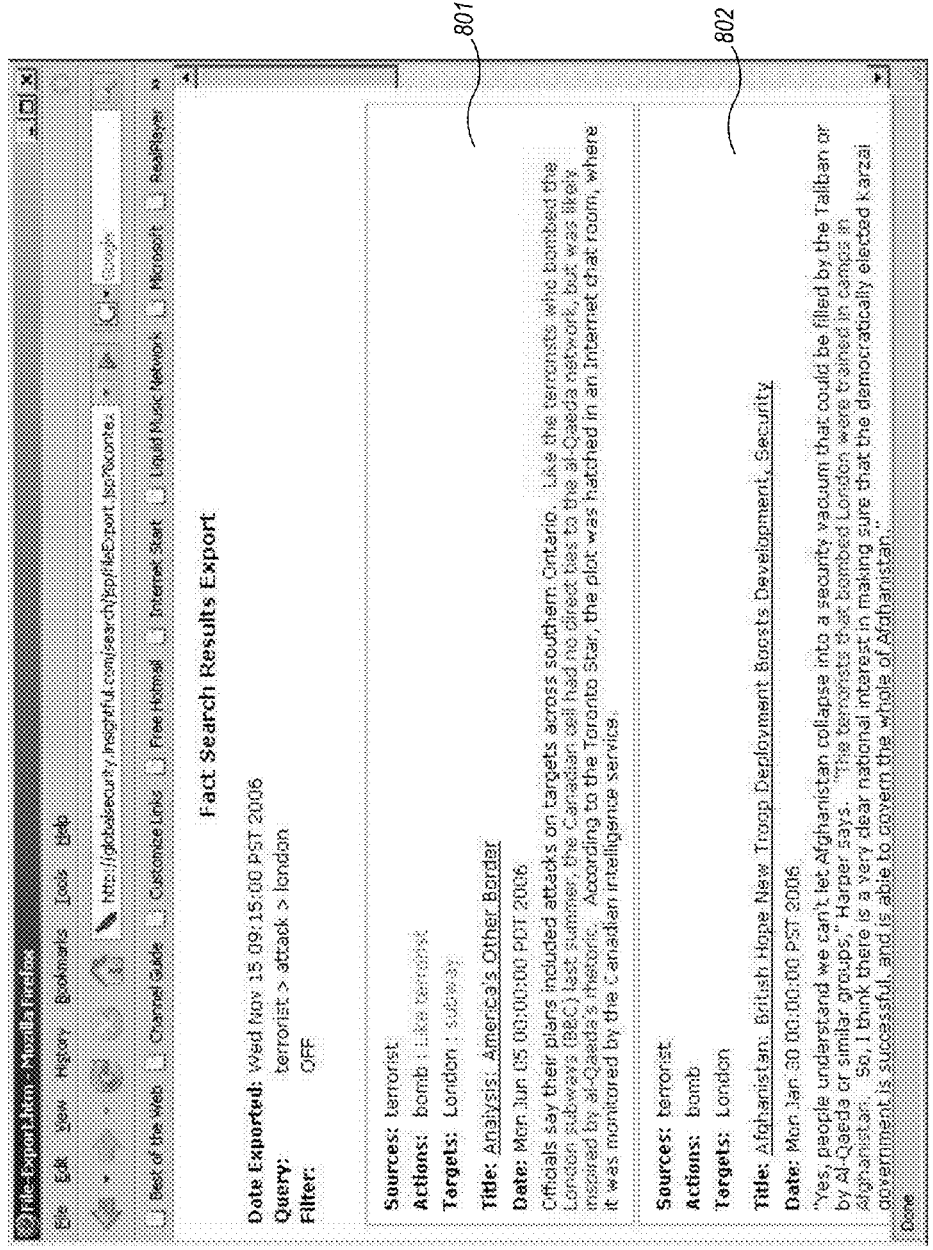
FIG. 8 is an example screen display of a report of relationship query result.

FIG. 8 is an example screen display of a report of relationship query result. Each result 801 and 802 is displayed with relevant information such as the sentence that matched the query and the terms that matched the relationship query components (sources, actions, targets).

Figure 9:
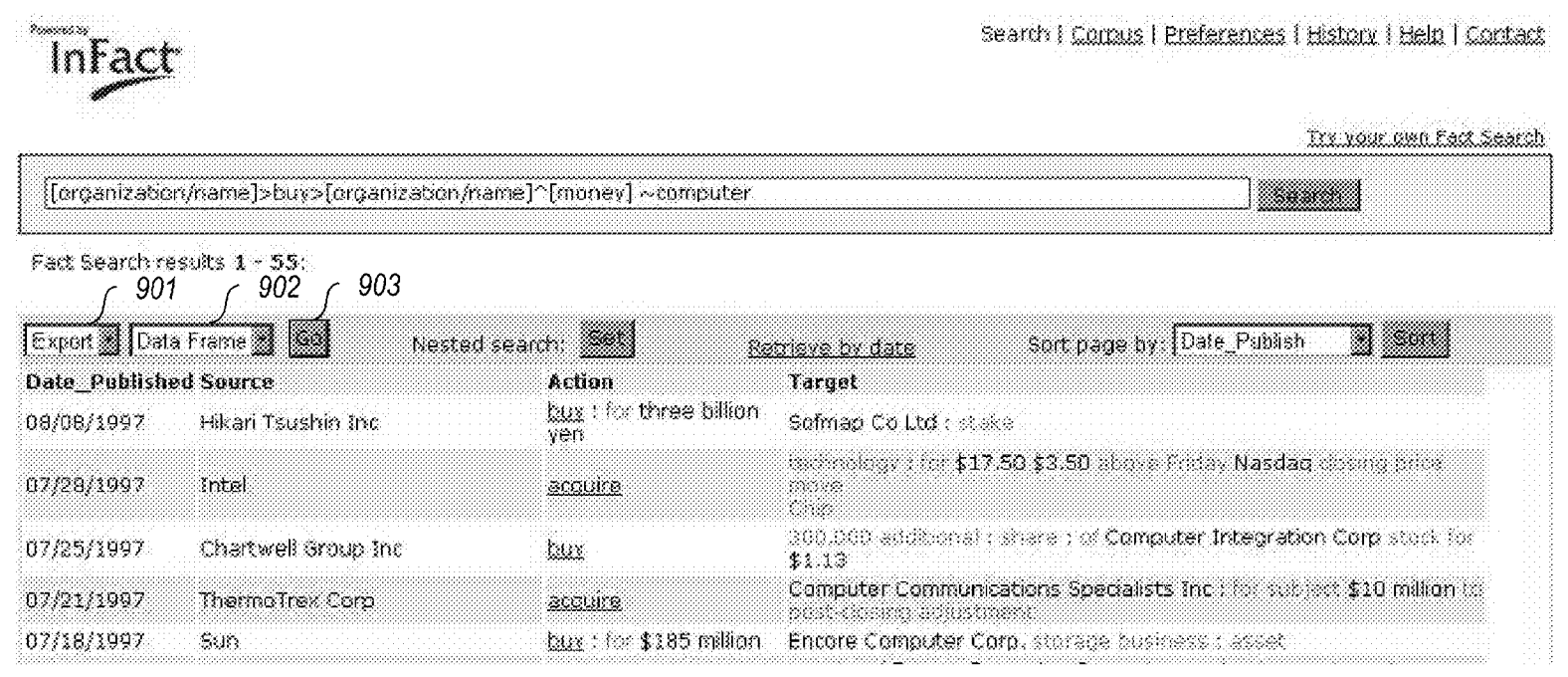

FIG. 9 is an example screen display of an interface for exporting search result data to a data frame. The user selects "export" via UI control 901, "data frame" via UI control 902, and the "go" button 903. In response, the SQE displays a visual interface for specifying the various columns for the data frame (file).

FIG. 10 is an example screen display of a visual interface for specifying attributes of a data frame for export. Using visual interface 1001, the user selects what components of a relationship query, including tags such as grammatical role tags and/or entity tags, metadata, etc. should be assigned to which columns. As shown the user has selected the relationship query's "source" term 1002 as column 1; the query's "action" term 1003 as column 2; the query's "target" term 1004 as column 3; a prepositional phrase term 1005 if present in the matching result as column 4; a publishing date (e.g., metadata) 1006 if present as column 5; and the country of an creator of the work (e.g., metadata) 1007 if present as column 6. New columns can be added by selecting the "Add Column" button 1008. A preview 1009 of the results is also available. Once the user is satisfied with the data frame format to be exported, the user can select the "Export Data" button 1010.

Figure 11:
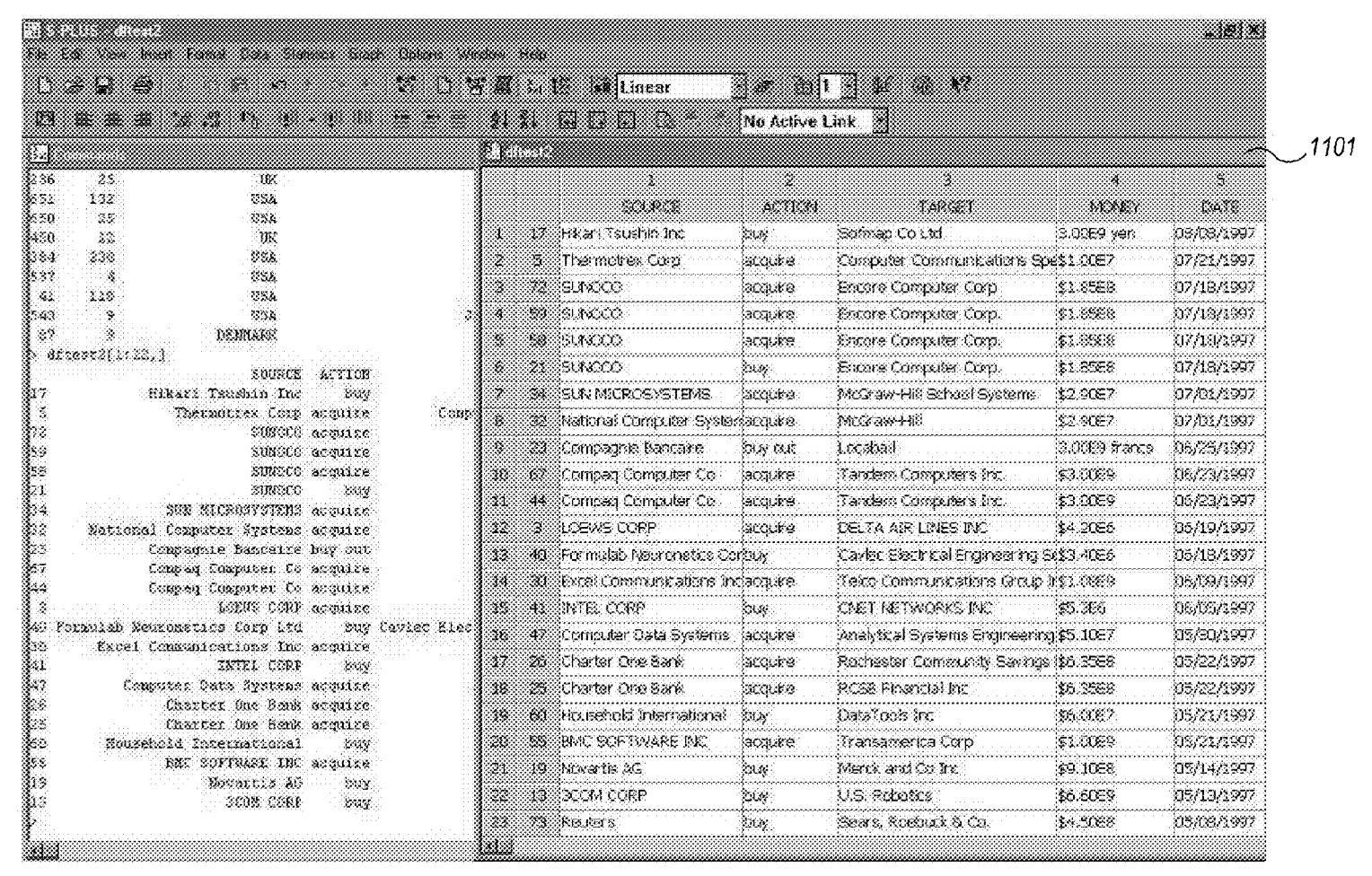

When the data is exported, it is typically stored as a tab-delimited file. Different delimiters can be incorporated through configuration parameters. FIG. 11 is an example screen display of a data frame once exported into another application. For example, the application illustrated in FIG. 11 is S-PLUS, and the relationship query result data exported using the SQE has been imported into an S-PLUS object (displayed as 1101) for further analysis and modeling using standard S-PLUS statements to import data into an S-PLUS variable.

Automatic Guided Navigation Tips

Embodiments of syntactic query engines have been enhanced to incorporate automated tips for users to increase the ability of a user to specify a desired search. Based upon the inverted indexes used to represent the corpus, the ontologies used in the system and other rules (such as popularity of term choice, etc.) these tips act as "suggestions" to the user to specify with greater particularity a possibly desired search.

Behind the scenes, when a query (e.g., either a document level search such as one or more keywords or a relationship search, including portions of a or an entire relationship query using IQL) is entered, the SQE attempts to determine what relationship searches might be desired based upon a set of rules parsed and evaluated by the SQE. Then, the SQE attempts to run some number of these potential searches in the background (up to all such possibilities). Thereafter, depending upon the particular tip user interface, some indication of the navigation tips and/or search results of the tips are presented to the user. Once displayed, the user can then choose one or more of these preformed searches (by selecting the navigation tips) to quickly see results.

The query may take the form of either one or more keywords, an IQL expression, or components of an IQL expressed query. For example, a user may enter the keywords "Japan China" to try to determine relationship and event information relating to both countries, and the SQE will respond with appropriate navigation tips to assist the user to discover more information. As another example, the user might type in a partial IQL expression such as "China< >*~Japan", and the SQE will attempt to recognize the input as particular components of IQL such as a source entity and a context operator expression.

The rules used to determine the navigation tips are specified, typically in a configuration file, by an administrator when the searching system is configured (or at other times). Each rule specifies some sort of template or specification for determining what relationship query to execute based upon the recognition of particular input. For example, a rule might specify that when a single entity is recognized as input, a rule that treats it as a source entity and looks for related organizations is fired. Such a rule might be expressed, for example, by single entity→"$IQLSource< >*< >[organization]"

where "$IQLSource" represents the source entity component of an IQL expression. Examples of different types of rule mapping specifications are illustrated in Appendices B and C, which are herein incorporated in their entirety.

Different heuristics and/or rules can be used to determine which potential search alternatives to suggest, the order they are suggested, etc. For example, the number of results returned, the popularity of a particular search (e.g., how many times it has been executed against that corpus), or other measurements of value or interest can be incorporated. Note that other types of rules and an entire programming or scripting language for running and combining potential queries can be defined for use by the SQE.

In one embodiment, the searches are run to validate whether there are any results for a particular tip before showing them to a user. In another embodiment, the searches are run (typically in the background and even in parallel), the results cached, and indications to some number of them presented to the user. In some embodiments, the cached tip results are first consulted to speed up response time. The cached tip results can also be useful to return tips to a user when an SQE facility is under heavy load and desires to suspend tip rule processing. Also, depending upon the architecture and infrastructure used to evaluate and perform the tip searches (which execute typically in the background), the SQE can perform load balancing, parallel processing, etc.

According to one example embodiment, which can be accessed via url "www.globalsecurity.org," the SQE provides navigation tips to a user based upon whether it can recognize the specification of a (single) entity that is part of a configured ontology. More specifically, the SQE looks at the user specified entity and determines whether there are one of more ontology paths that include the user-specified term as a "leaf" node (an entity). If not, no tips are suggested. If so, then the SQE runs one or more appropriate relationship searches that corresponds to each possible ontology path, in the background using rules that define which searches to run in order to "validate" the searches against the particular corpus. In some instances, only searches that result in matches are then presented to the user.

In some implementations, a configuration file containing rules is supplied (for example by a system administrator) and a mapping (or other means for specifying a set of rules) is stored between entities to be recognized and potential searches to execute. The configuration file may be parsed and the mappings stored when the system comes up or at other times. Appendix B contains one example of a set of ontology path specifications and mappings to corresponding queries as specified for such a configuration file. Also, depending upon the implementation, the SQE may implement different orders or precedence for applying recognized rules. In one case, the rules are applied in the order that they are encountered in the configuration file, so if an entered query matches multiple rules in the file, the first encountered set of rules will apply. In another case, all of the matched rules are applied and all of the potential searches performed in the order specified. Other orders of precedence can be similarly incorporated.

Figure 14:
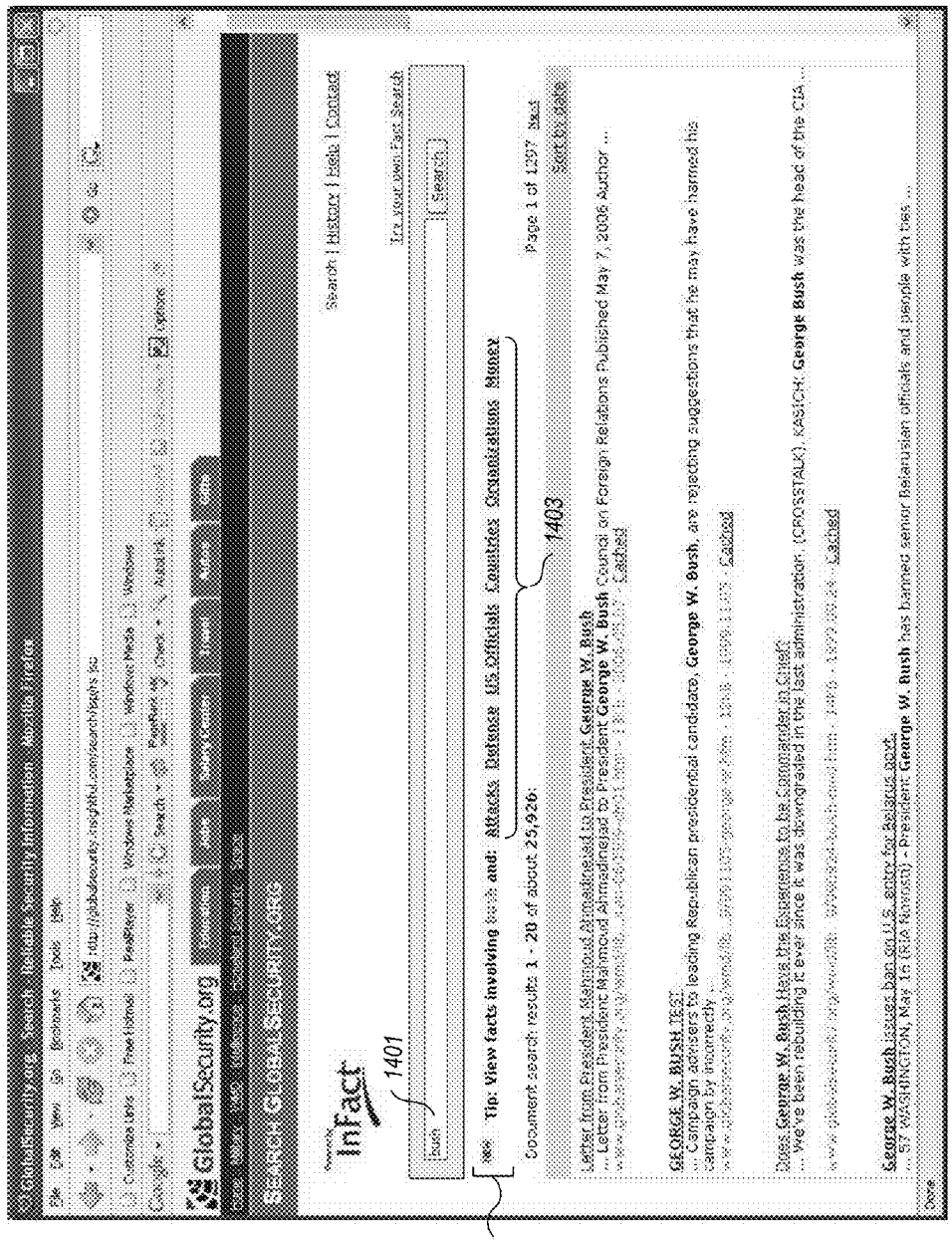
FIG. 14 is an example screen display of navigation tips according to a first embodiment.

FIG. 14 is an example screen display of navigation tips according to a first embodiment. In FIG. 14, the user enters a term (e.g., one or more keywords) or entity in the query field 1401 (for example "Bush"), and the SQE presents possible tips to the user in tip link area 1402. In the illustrated example, the SQE has determined (after running appropriate queries in the background and according to a rules file) that the tips shown as tip links 1403 are viable relationship searches for that particular corpus. Internally, the SQE may apply a series of rules and/or heuristics to determine whether a particular relationship search is viable; such as, a minimum/maximum number of results returned, the top "n" in a ranked ordering, etc. The tip link area 1402 informs the user a little about the search, using the general structure "View facts involving <entity name> and <tip1> <tip2> . . . <tip n>," where the <entity name> and <tip> are appropriately substituted.

Figure 15:
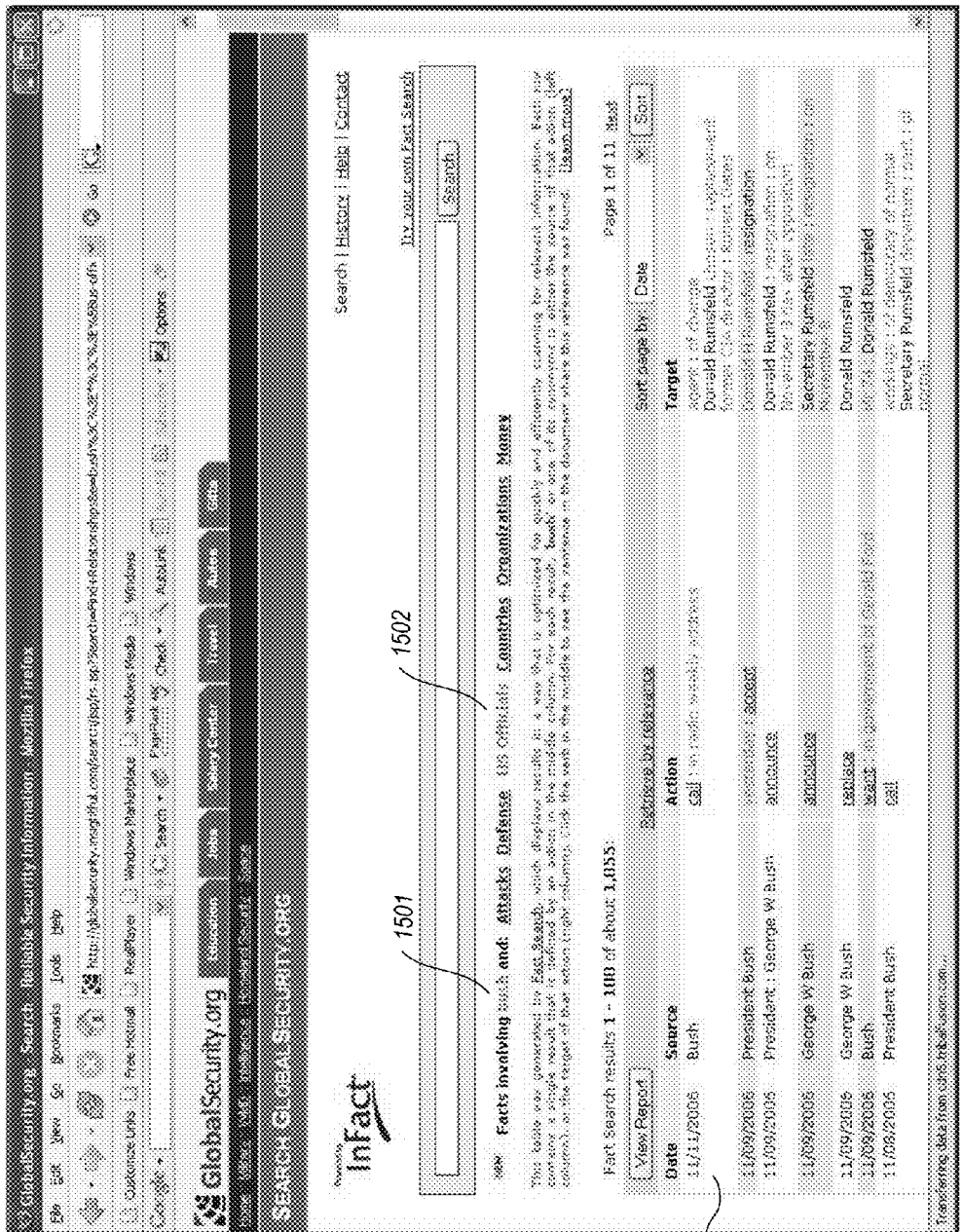
FIG. 15 is an example screen display of the results provided upon selection of a navigation tip according to the first embodiment.

To use a tip, the user selects one of the tips from the tip link area 1402. FIG. 15 is an example screen display of the results provided upon selection of a navigation tip according to the first embodiment. In FIG. 15, the user has (previously) indicated the entity "Bush" (see entity name 1501) and has selected tip link 1502 "US Officials," because the user is interested in seeing recent news on the resignation of President Bush's Secretary of Defense, Donald Rumsfeld. The results of the tip are shown in summary result area 1503.

Figure 16:
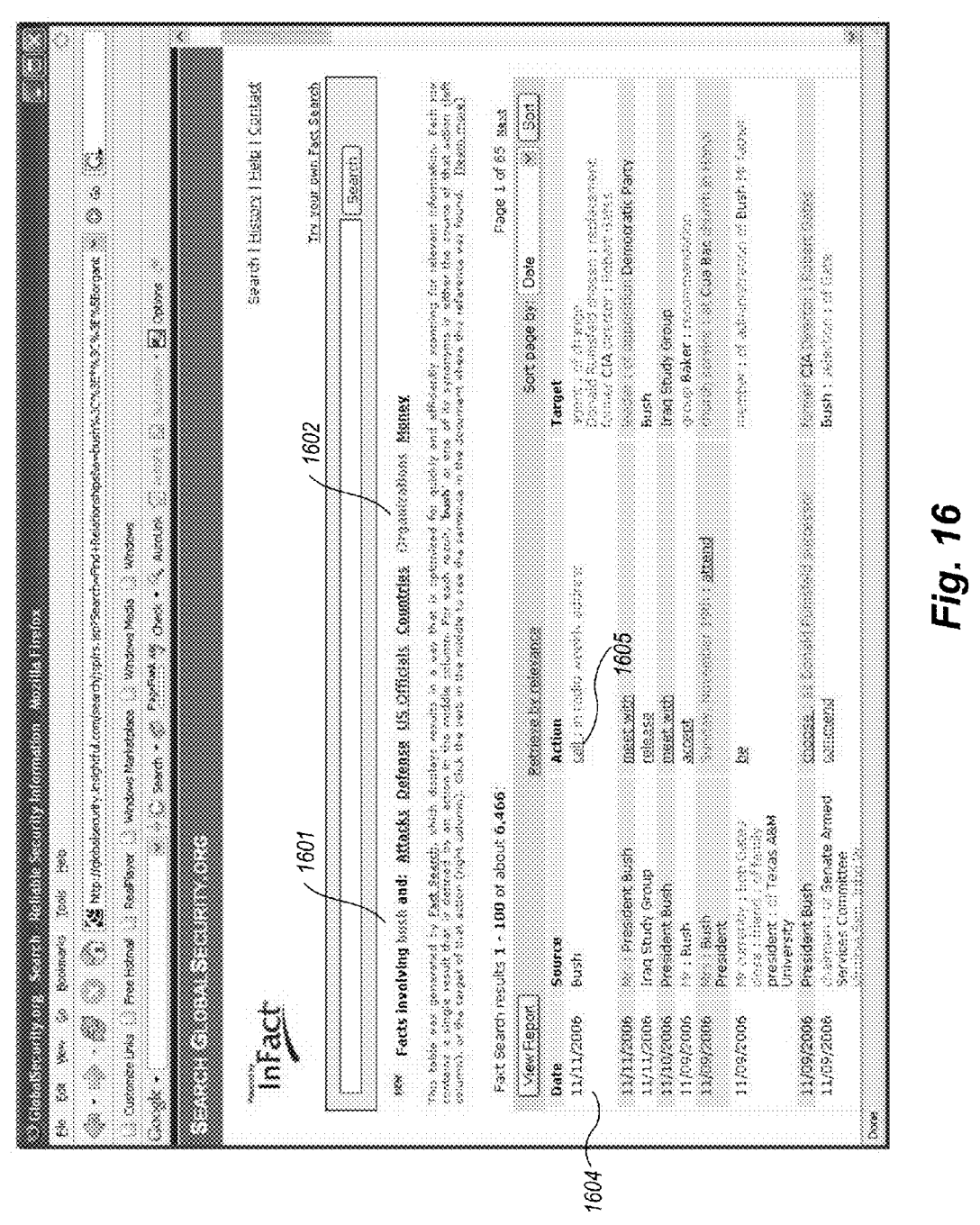

Alternatively, suppose that the user wanted to see who President Bush chose as a replacement Secretary of Defense—the user knew the person came from another government agency, but couldn't remember which agency. FIG. 16 is an example screen display of the results provided upon selection of a second navigation tip according to the first embodiment. In FIG. 16, the user has selected the "Organizations" tip link 1602 and can view a summary of the results in summary area 1604. Note that from the summaries alone shown in FIGS. 15 and 16, the user can quickly get the desired information. Then, if more detail is desired, the user can follow the action link (e.g., "call" 1605) as described elsewhere to view the underlying document.

Note as well that different user interfaces can be used to display the tips. In one such interface, a menu of possible search specifications is provided. In another interface, links are presented that can be selected to show "fast search" results.

According to a second example embodiment, which can be accessed via url "books.infact.com," the SQE provides navigation tips to a user based upon whether it can recognize one or more keywords (as in a document level search) or the specification of (any part of) a relationship query using IQL. More specifically, the SQE looks at the user specified entry and determines whether there are rules that map additional relationship queries to the keywords and/or recognized (portion of a) relationship query. In the case of keyword input, the SQE first parses the input (using the extended natural language parser of the SQE) to transform the input into a relationship query structure (an enhanced or normalized data structure of the SQE) that can be compared with the rules. Appendix C contains one example of a configuration file having a set of mappings from a relationship query structure (which may contain a single entity or action) to corresponding additional queries. Note that the configuration file of Appendix C specifies rules using XML tag definitions; however, as indicated above, other languages, specifications, and mappings could be used. Based upon evaluating the corresponding rules, the SQE then display the potential other relationship queries that might be of interest to the user. FIGS. 17-24 are example screen displays from this example navigation tip interface.

Figure 17A:
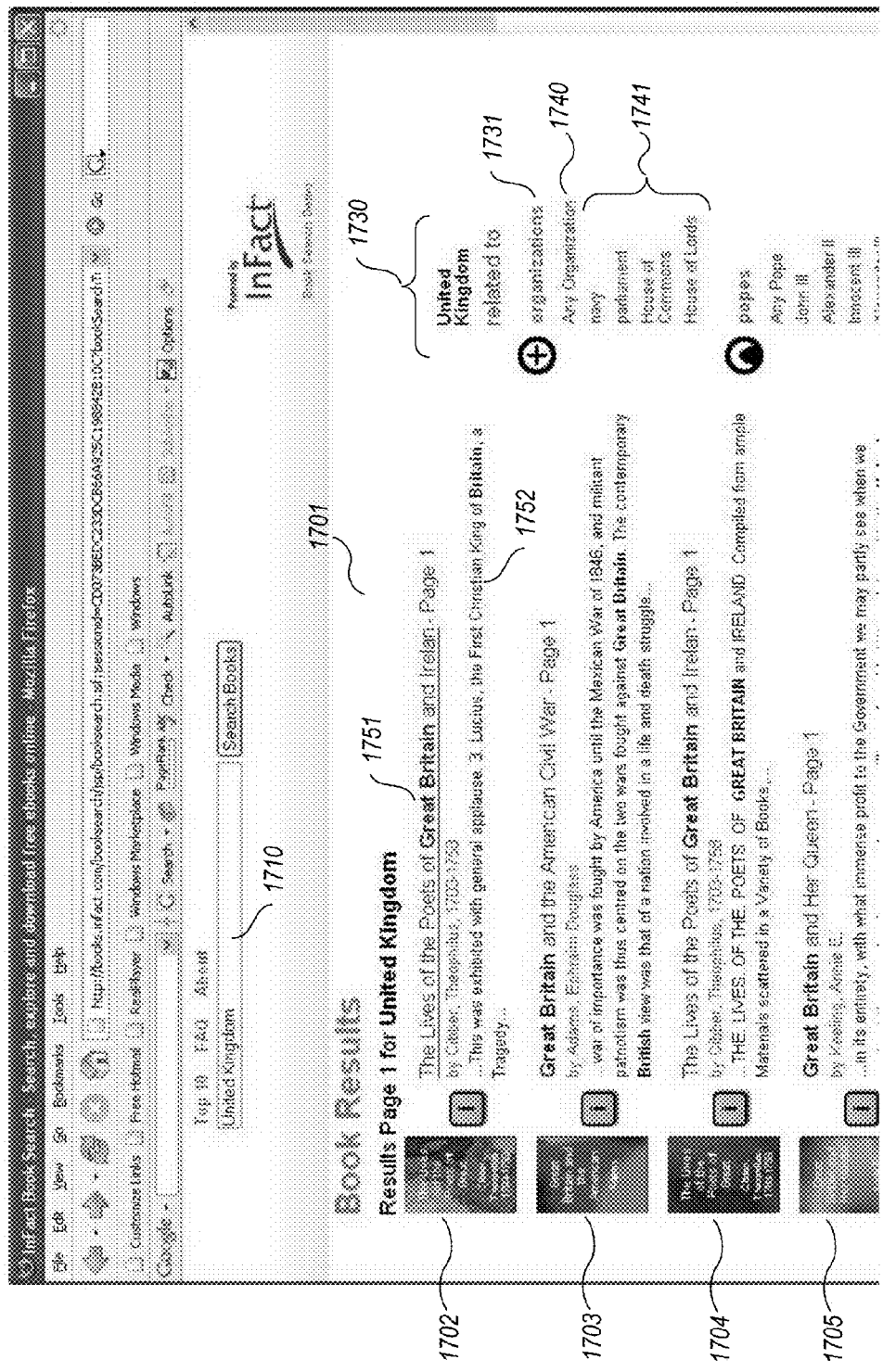
FIGS. 17A and 17B are an example screen display of initial results when a user enters a query based upon a frequently occurring place in a corpus of books.
Figure 17B:
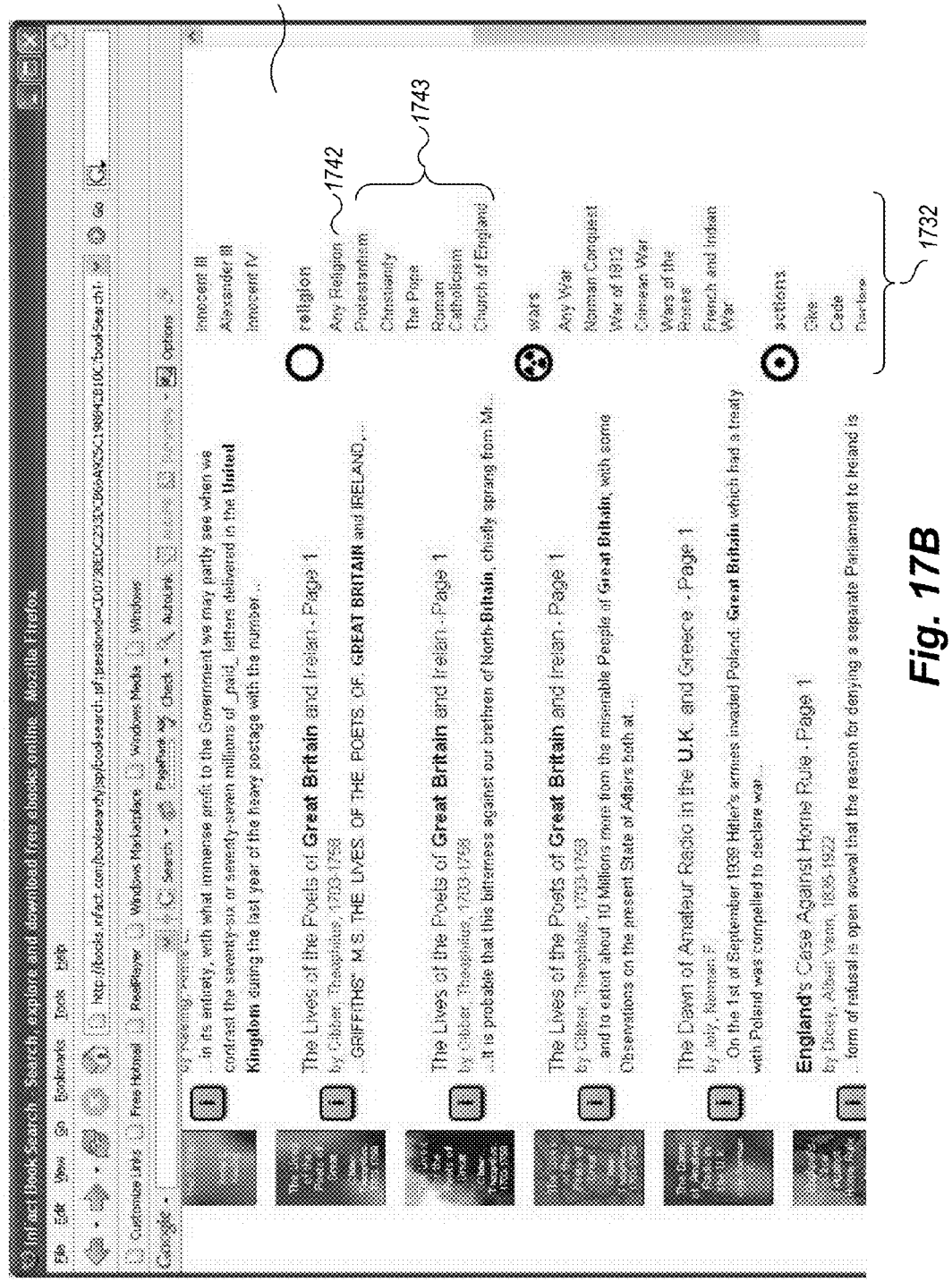

FIGS. 17A and 17B are an example screen display of initial results when a user enters a query based upon a frequently occurring place in a corpus of books. In this example, the user has entered "United Kingdom" (which is displayed in query field 1710) and the SQE lists all of the books relating in some manner with the United Kingdom ("UK") in a query results summary area 1701. Entries for each matching book 1702-1705 are shown, along with links based upon the matching location in the book (where "United Kingdom" or an equivalent synonym, abbreviation, etc.) occurs. The user can follow such a link to see the context in the book where "United Kingdom" (or its equivalent term) appears. The SQE also presents navigation tips to the user in tips area 1730, which are the links to additional relationship queries that the user can run to obtain more information. In this particular example, the tips are organized in groups (entity types or action types) such as the "organizations" group 1731. Within the organization group 1731, a general relationship query 1740 corresponding to [organizations] as a type of entity (e.g., any organization) is shown. In addition, "deep" tips 1741 are provided where particular instances of the entity type relationship search have yielded search results. In some implementations these search results may be cached for quick access. Another general relationship query 1742 (see FIG. 17B) shows a navigation tip corresponding to [religion] (e.g., any religion) as type of entity. Relationship queries that correspond to specific instances of the religions found in this corpus are displayed as deep tips 1743 as long as they meet whatever presentation rules and heuristics are defined by the SQE tip subsystem (e.g., all queries that yield more than 1 result).

Note as well that, in some embodiments, synonyms for tips are collapsed and other normalizations of the tips are performed. For example, if during the tip construction process the SQE determines that relationship queries yield valid results against the corpus for "Bill Clinton," "William Clinton," and "President Clinton," then the tip subsystem may display a single deep tip "Clinton." Similarly, synonyms such as "UK," "Great Britain," and "United Kingdom" will be coalesced into one tip. Other normalizations, such as upper and lower case transformations may also be performed.

Figure 18A:
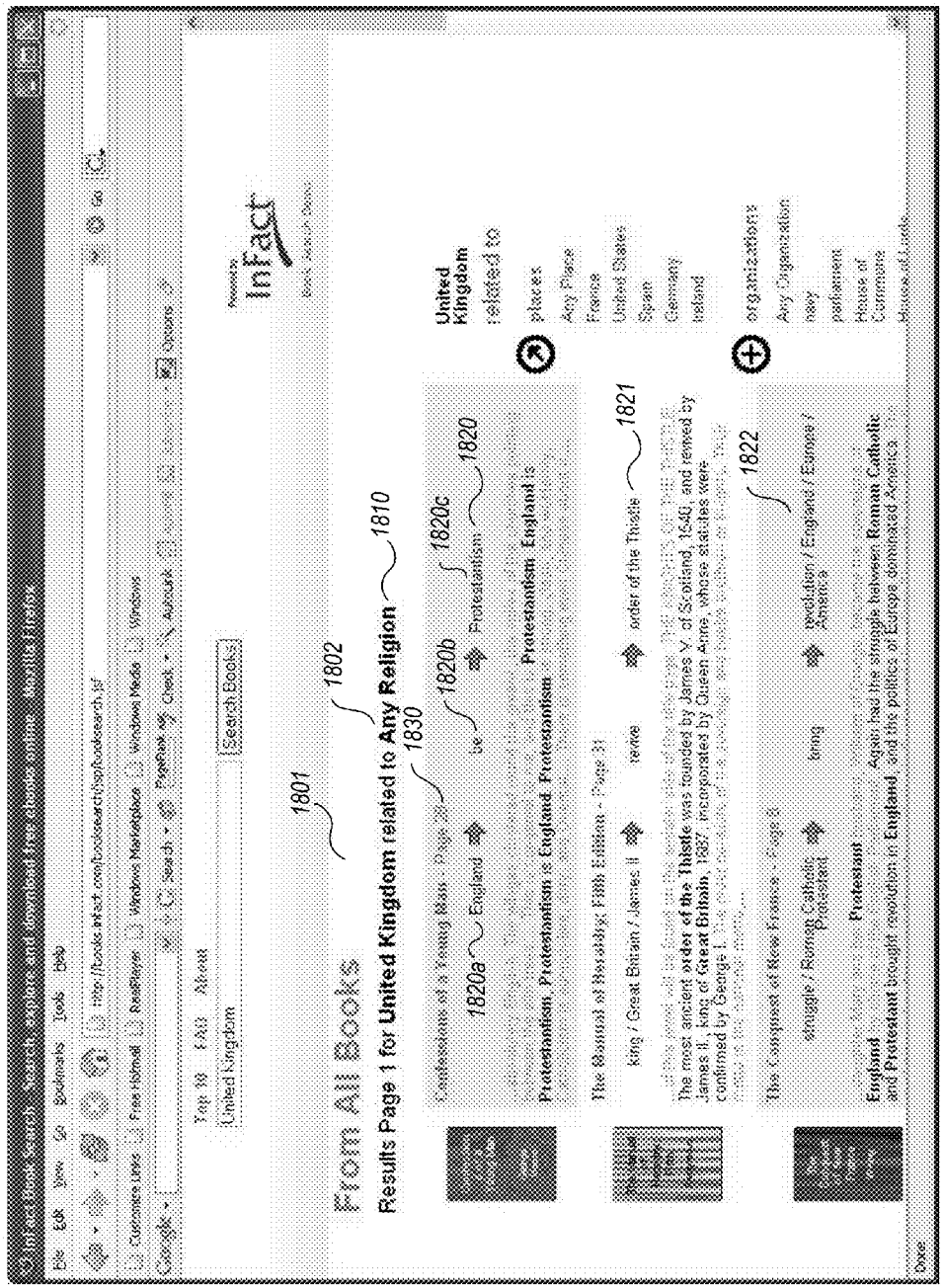
FIGS. 18A and 18B are an example screen display of results when a user selects a navigation tip.
Figure 18B:
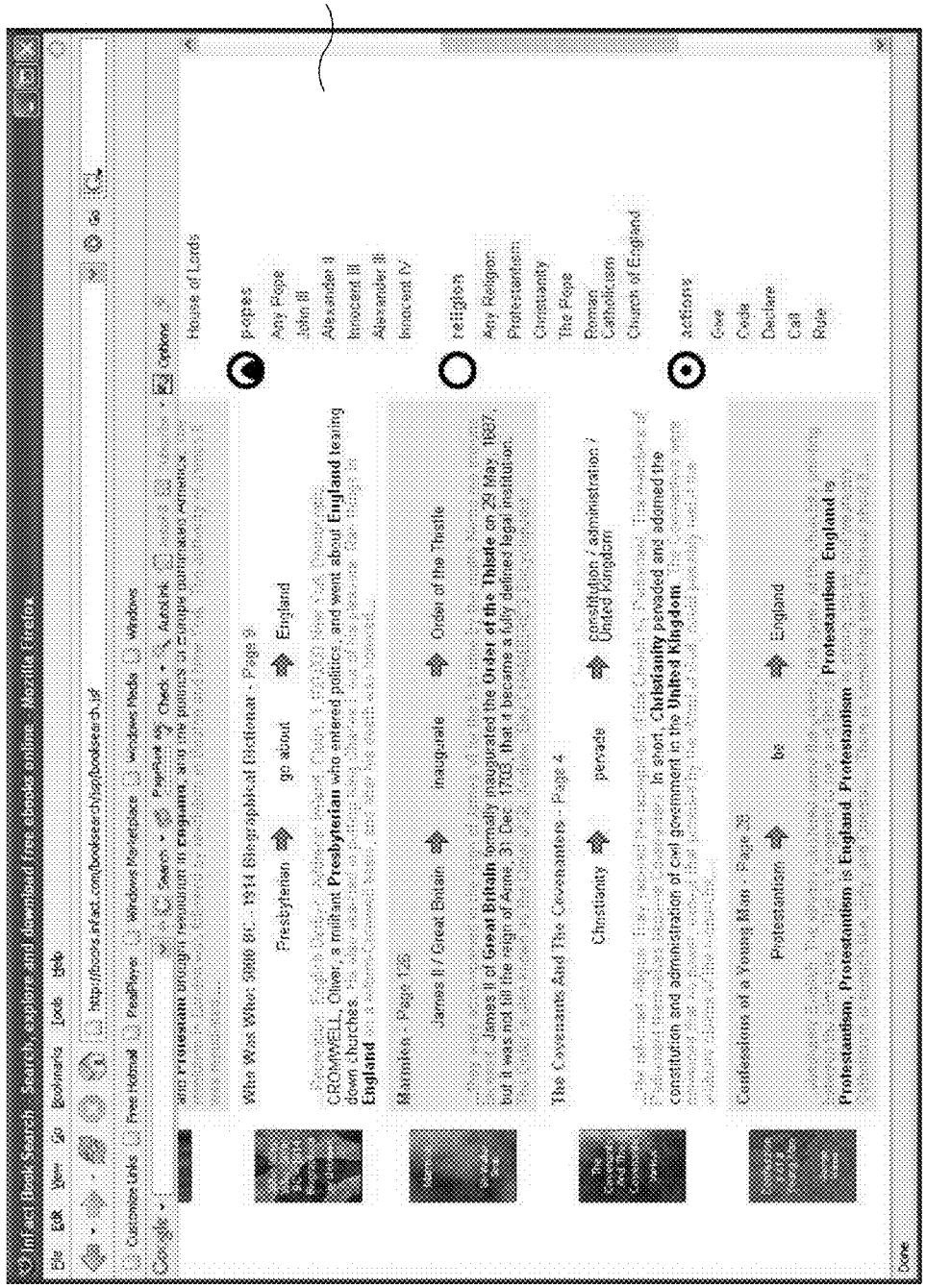

FIGS. 18A and 18B are an example screen display of results when a user selects a navigation tip. FIG. 18A shows the results in result summary area 1801 after the user has selected the "any religion" tip 1742 in FIG. 17B. Query information area 1810 shows that the relationship query that was executed resulted in books that describe ways in which the United Kingdom relates to religion. Each relationship query that was evaluated by the SQE in response to selection of the tip 1742, for example queries 1820, 1821, and 1822, is illustrated as part of the corresponding matching book entry. Each book entry shows the book's title 1830, the matching sentence in the book, the portions of the sentence that match the relationship query in bold, and the source entity 1820*a*, action 1820*b*, and target entity 1820*c* that were evaluated in the corresponding relationship query 1820.

Figure 19:
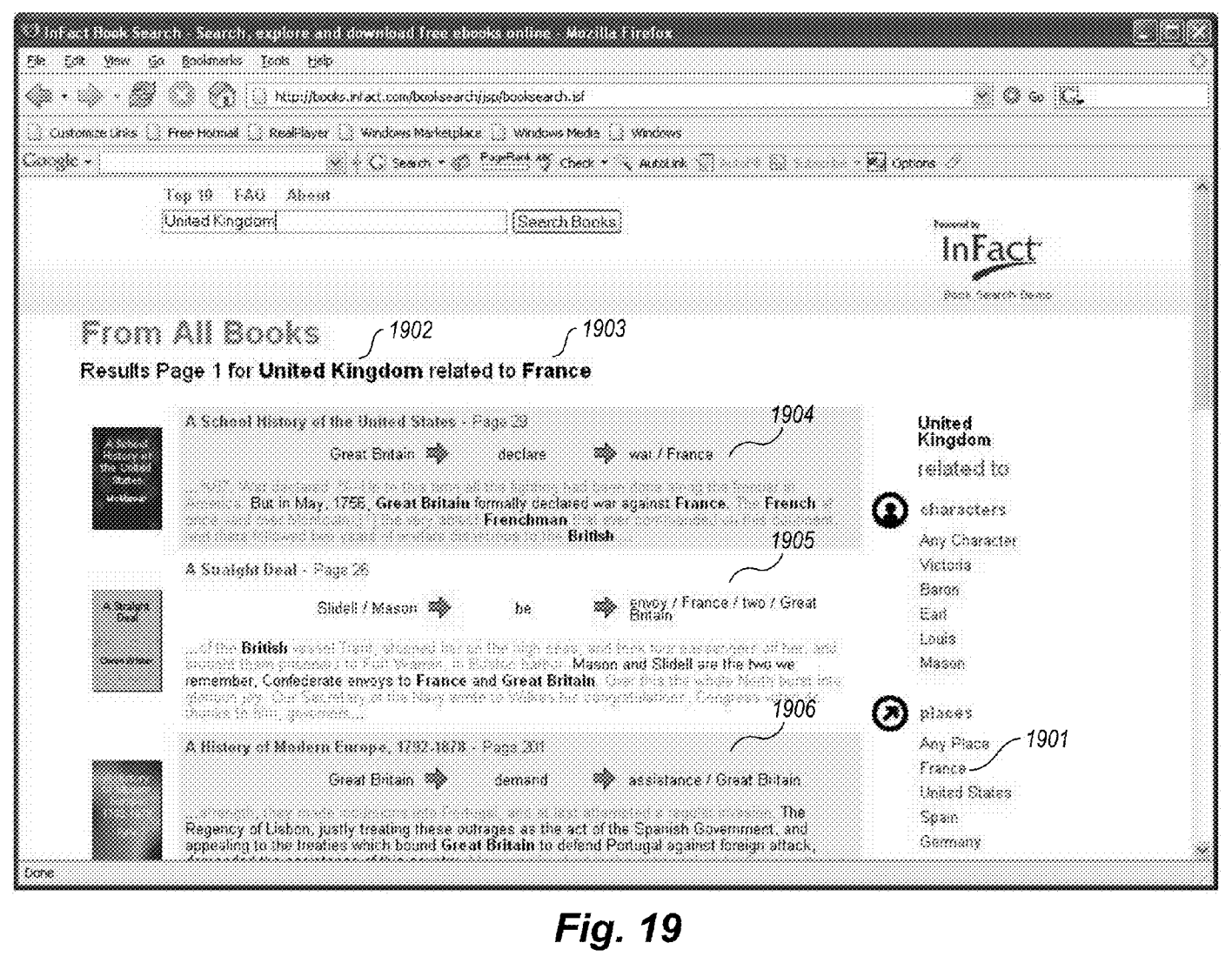

FIG. 19 is an example screen display of results determined when a user selects a deep navigation tip. In this case, the user selects the deep tip "France" 1901 to show the relationships between the United Kingdom 1902 and France 1903 as described by the books in the corpus. By observing the relationship queries (e.g., queries 1904, 1905, and 1906), it is apparent that different relationship queries (i.e., different IQL statements) have been executed that use (recognize) the input (including the user input and the selected entity/action reflected by the tip) to correspond to different aspects of a relationship search. For example, relationship query 1904 shows that "Great Britain" (as a synonym of the "United Kingdom" as an entity) is used in that query as a source entity of the relationship query 1904 and "France" is used as a target entity of the relationship query 1904. Relationship query 1905, however, shows both entities "Great Britain" and "France" as being part of only the target entity. Also different, relationship query 1906 shows "Great Britain" as being used as both a source and target entity. (The term "France" is likely specified as a document constraint or as a context operator, depending upon the specific corresponding rule.) Thus, the relationship searches that are suggested by the tips tend to give different suggestions than might otherwise be readily apparent.

In the books corpus example, a user can also peruse individual books and quickly get more information using relationship searching and navigation tips. FIGS. 20-24 describe some of the aspects of navigation tips used to discover information about a single book.

Figure 20:
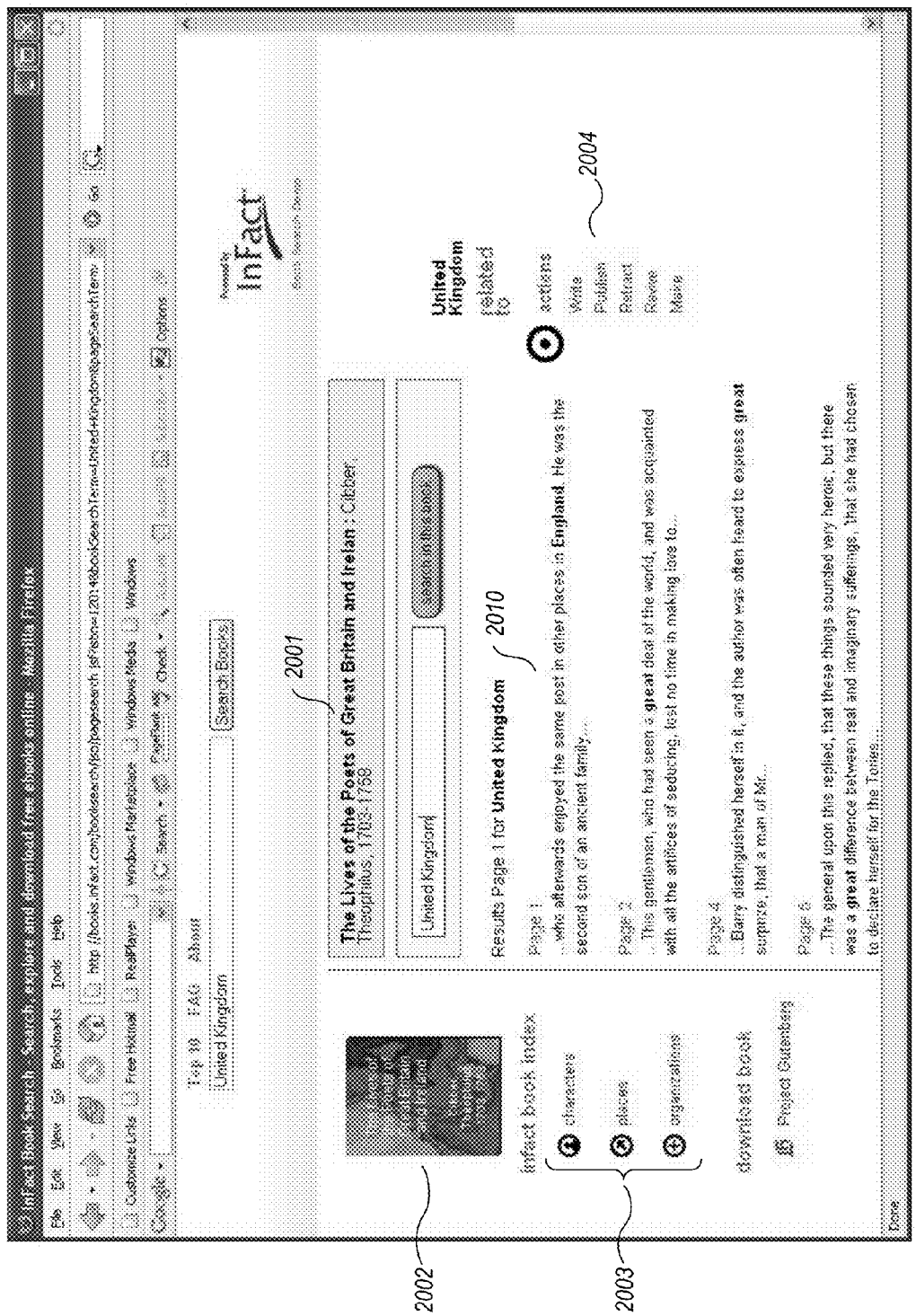
FIG. 20 is an example screen display of the resulting information displayed when a user follows a link to select an individual book.

FIG. 20 is an example screen display of the resulting information displayed when a user follows a link to select an individual book. In this case, the book selected is book 1704 in FIG. 17. Information about the entities present in the book 2002 is shown as part of book index area 2003. Results regarding matching text (to the prior relationship query "United Kingdom") are shown in result summary area 2010. Additional navigation tips—this time regarding events (actions) that may be discussed in the books are described in tip area 2004.

Figure 21:
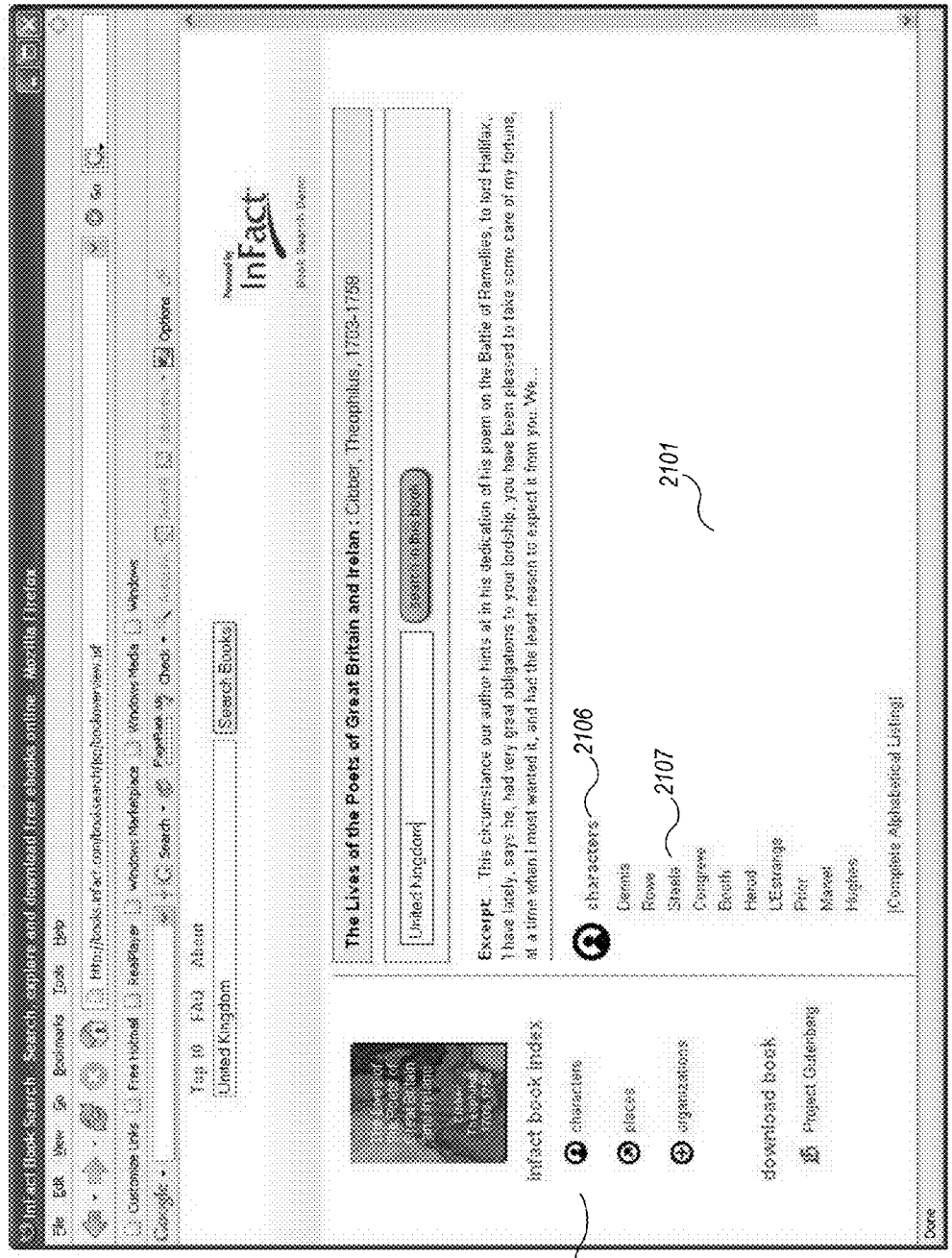
FIG. 21 is an example screen display of example entity instances that correspond to an entity type selected from a book index.

When the user selects an entity type in the book index area 2003, the various instances of entities that appear in the book are displayed. FIG. 21 is an example screen display of example entity instances that correspond to an entity type selected from a book index. In FIG. 21, the user has selected the "character" entity type 2105, and the particular characters that appear in the book are displayed as characters 2106 in result summary area 2101. To select a particular character, the user selects a link to the entity (for example, "Steele" 2107).

Figure 22:
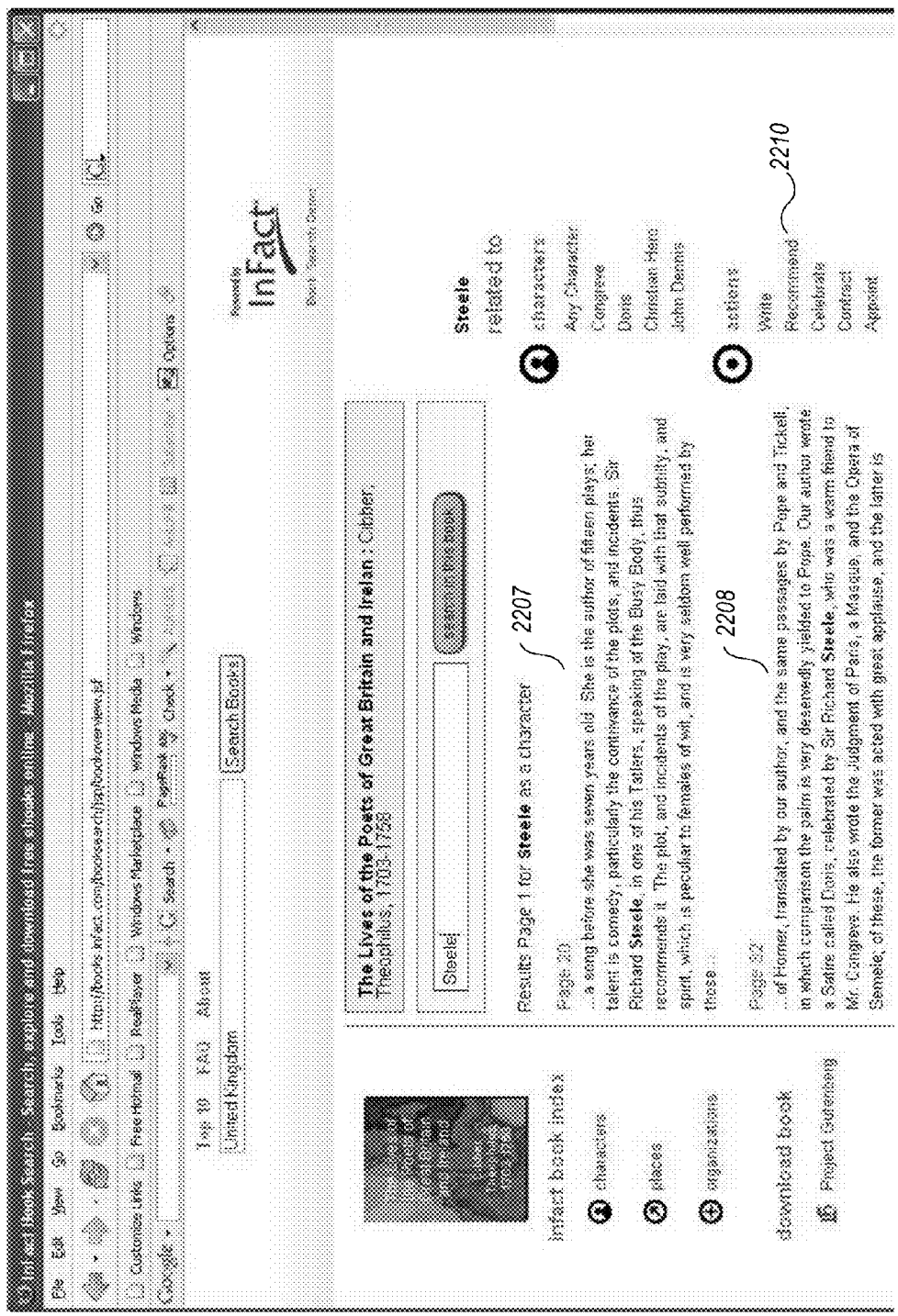
FIG. 22 is an example screen display of the resulting information displayed when a user selects a particular entity.

FIG. 22 is an example screen display of the resulting information displayed when a user selects a particular entity. In this example, two passages 2207 and 2208 describe the character, "Steele" in the selected book. The user can further explore what Steele does in the book, or events that relate to that character, by selecting one of the action tips 2210.

Figure 23:
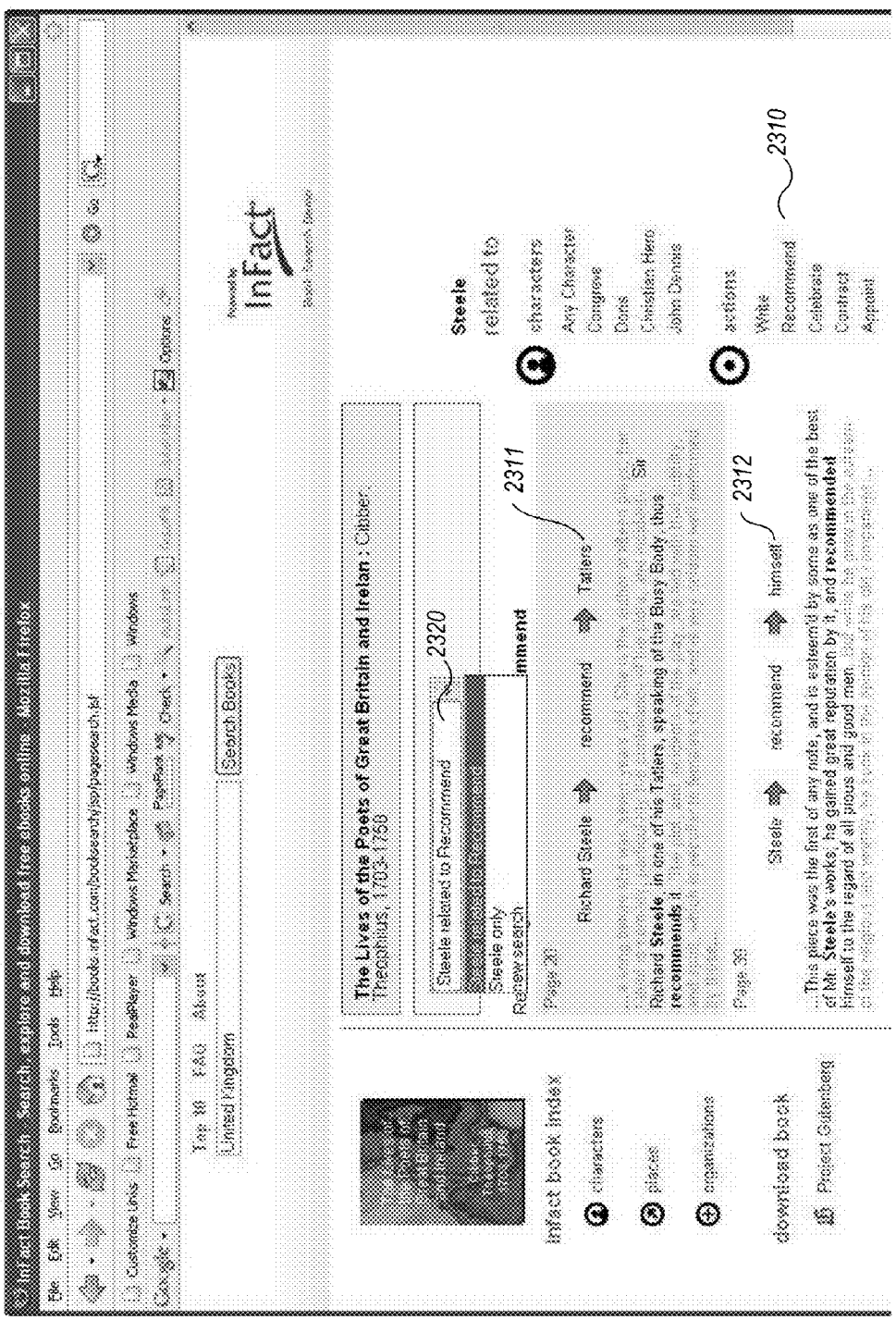
FIG. 23 is an example screen display of a relationship query executed when a user selects an action pertaining to a selected entity.

FIG. 23 is an example screen display of a relationship query executed when a user selects an action pertaining to a selected entity. In FIG. 23, the user has selected the navigation tip for the action "recommend" 2310, and the results 2311 and 2312 of executing a corresponding relationship query are shown. Note as well that a history of the executed relationship queries is available as history control 2320, allowing a user to become more familiar with relationship queries and to re-execute them quickly.

Figure 24:
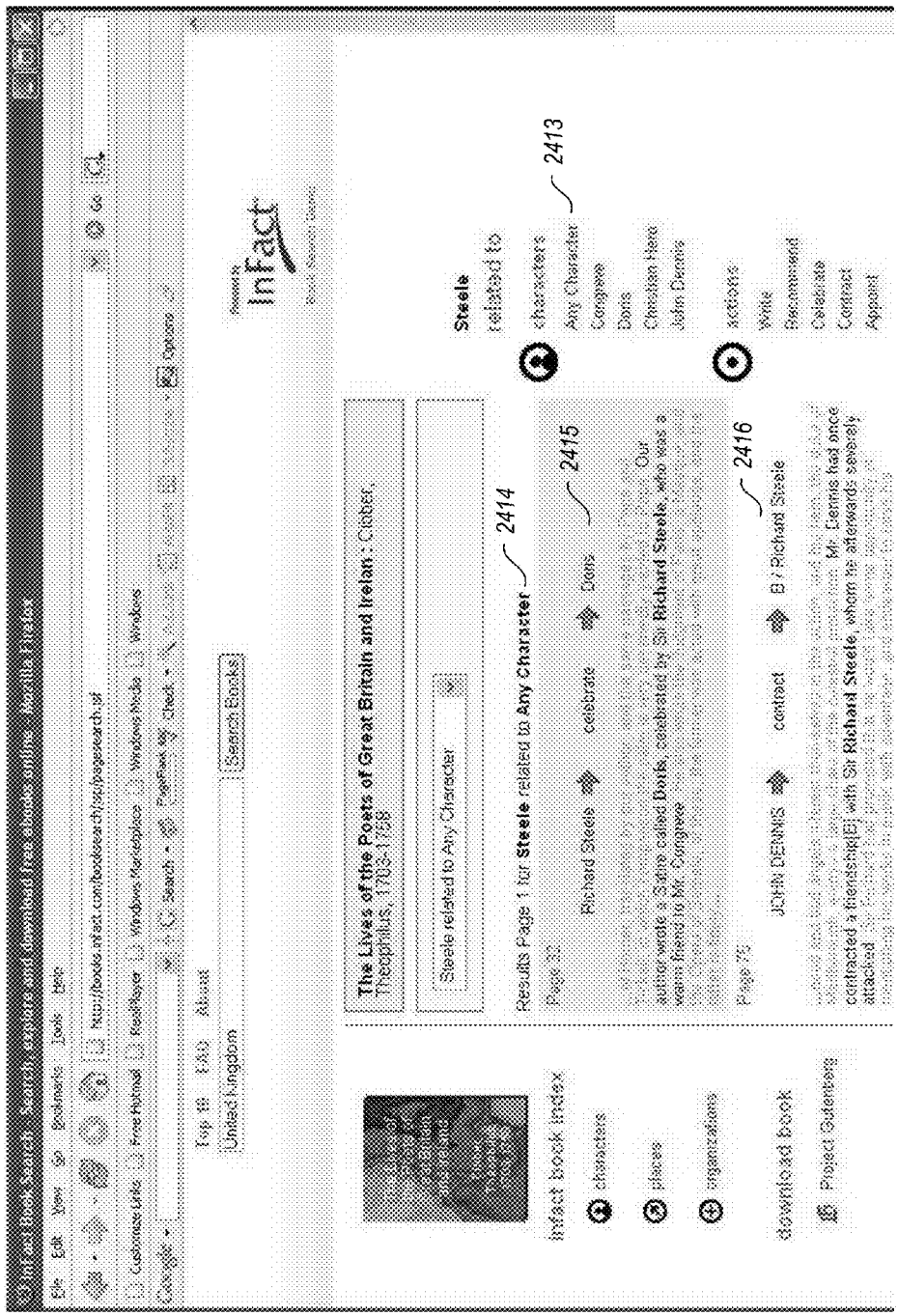
FIG. 24 is an example screen display of a relationship query executed when a user selects another entity pertaining to a selected entity.

FIG. 24 is an example screen display of a relationship query executed when a user selects another entity pertaining to a selected entity. In FIG. 24, the user has selected the navigation tip for a second entity, in this case an entity type "any character" 2413, to see the relationships between the poet Steele and other people in the book. The results 2415 and 2416 of executing a relationship query that corresponds to the selected tip 2413 are shown.

Figure 25:
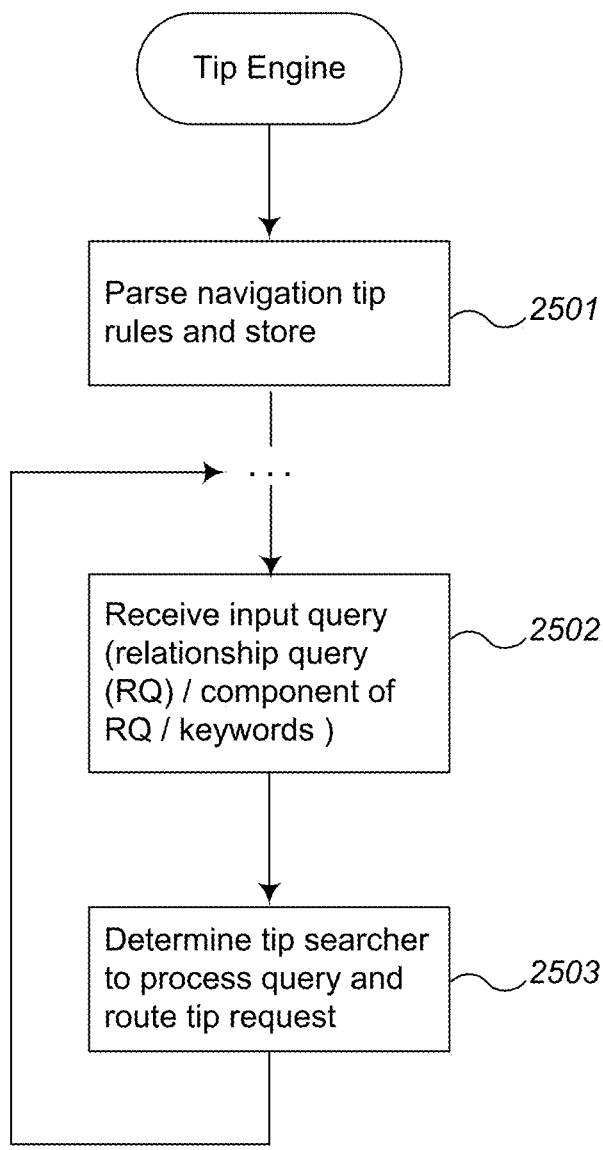
FIG. 25 is an example flow diagram of the typical steps performed by an SQE tip engine to process tips.
Figure 26:
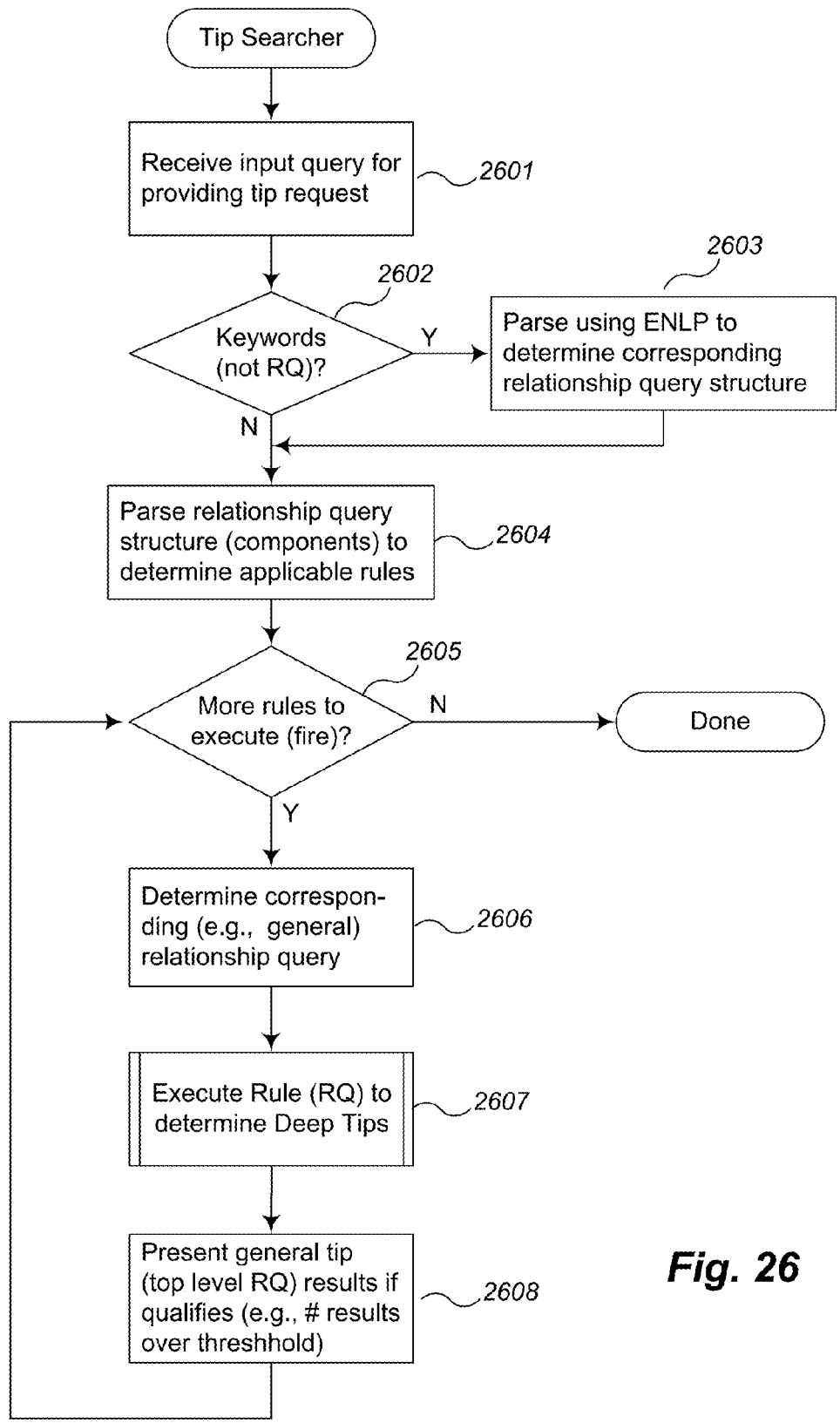
FIG. 26 is an example flow diagram of processing performed by a tip searcher component to determine navigation tips for an indicated relationship structure.

There are any number of techniques an SQE can use to provide the interfaces and navigation tips described in FIGS. 14-24. FIGS. 25 and 26 illustrate typical operations of an example embodiment of a tip engine/subsystem provided by enhanced SQE. Note that, as there are any number of known ways to architecturally configure and implement the components of such as system using for example distributed computing techniques, parallelism, etc., including for example systems that are similar to those described in co-pending U.S. patent application Ser. No. 11/012,089.

FIG. 25 is an example flow diagram of the typical steps performed by an SQE tip engine to process tips. In step 2501, the tip engine parses the tip rules and stores the resultant mappings (from entity→rules in the first example embodiment or from relationship query→rules in the second embodiment). For example, when the SQE system initializes (or at other times), it reads the navigation tip rule configuration file and instantiates appropriate rule objects that can be invoked when a rule is found to match a specified query. In step 2502, the tip engine receives indication that a user has specified a query—however simple or complex. In step 2503, the tip engine determines a tip searcher component to process the indicated query, and returns to step 2502 to wait for the next input query.

Depending upon the architectural implementation, including the various parallel processing and load balancing techniques and components available, one or more components may actually be invoked to perform tip processing. In one implementation (not shown) a tip searcher manager is invoked by the tip engine to properly load balance and distribute requests to some number of tip searcher components. In addition, as will be described below, a tip searcher may further distribute execution of various relationship queries so that they can be performed in parallel. Other architectures are also possible.

FIG. 26 is an example flow diagram of processing performed by a tip searcher component to determine navigation tips for an indicated relationship structure. In step 2601, the tip searcher receives an indication of an input query as a tip request. In step 2602, the tip searcher determines whether the input query is keywords or already is in the form of a relationship query structure (the input processing performed this). If the input is keywords, then the tip searcher progresses to step 2603 to first parse the input using the Enhanced Natural Language Parser (the "ENLP") and then continues in step 2604. In step 2604, the tip searcher "parses" the relationship query structure into its components (e.g., source entity, target entity, and action) and determines from the stored rules which rules apply. As stated above, in some implementations, the rules are applied from top to bottom of a corresponding rule configuration file. In steps 2605-2608 the tip searcher performs a loop to execute the one (or more) rules that apply to the indicated relationship query structure components. Specifically, in step 2605, the tip searcher determines whether there are more rules to execute and, if so, continues in step 2606, otherwise it is done processing. In step 2606, the tip searcher determines from the rule a relationship query (typically a general one, for example, "$IQLSource< >*< >[organization]" to execute. Then, in step 2607, the tip searcher invokes a subcomponent/routine to execute the rule (perform the indicated relationship query) to get results and determine any deep tips. Of note, this processing could also be performed by the tip searcher itself, and, although FIG. 26 shows rule execution as a "loop," in some architectures each rule is processed in parallel. Other organizations and other architectures are applicable.

As an example, the rule file may specify a more general relationship query that involves an entity type or an action type. Once the rule is executed and the general relationship query evaluated, the tip searcher (or its components) can evaluate (weigh, score, filter, etc.) the particular entities/actions discovered as results from evaluating the general relationship query and then execute specific relationship queries for those entities/actions. The specific relationship queries that correspond to entities or actions (as opposed to types of entities or actions) can be used to provide the deep tips described in the screen displays above.

Assuming, for example, that the deep tips are determined asynchronously, at some point the results from executing the general relationship query are made available and the tip searcher is notified. In step 2608, the tip searcher determines from these results whether the general tip has generated results that satisfy the tip system rules and heuristics, and if so, presents them to the user. For example, if a (general) tip generates less than some threshold number of results, the tip system may not present a general tip. In other embodiments, the tip searcher always presents the general tip as it corresponds to an available rule. The tip searcher then returns to step 2605 to process the next rule, if any. If not, the tip searcher process is done (until invoked again).

Figure 27:
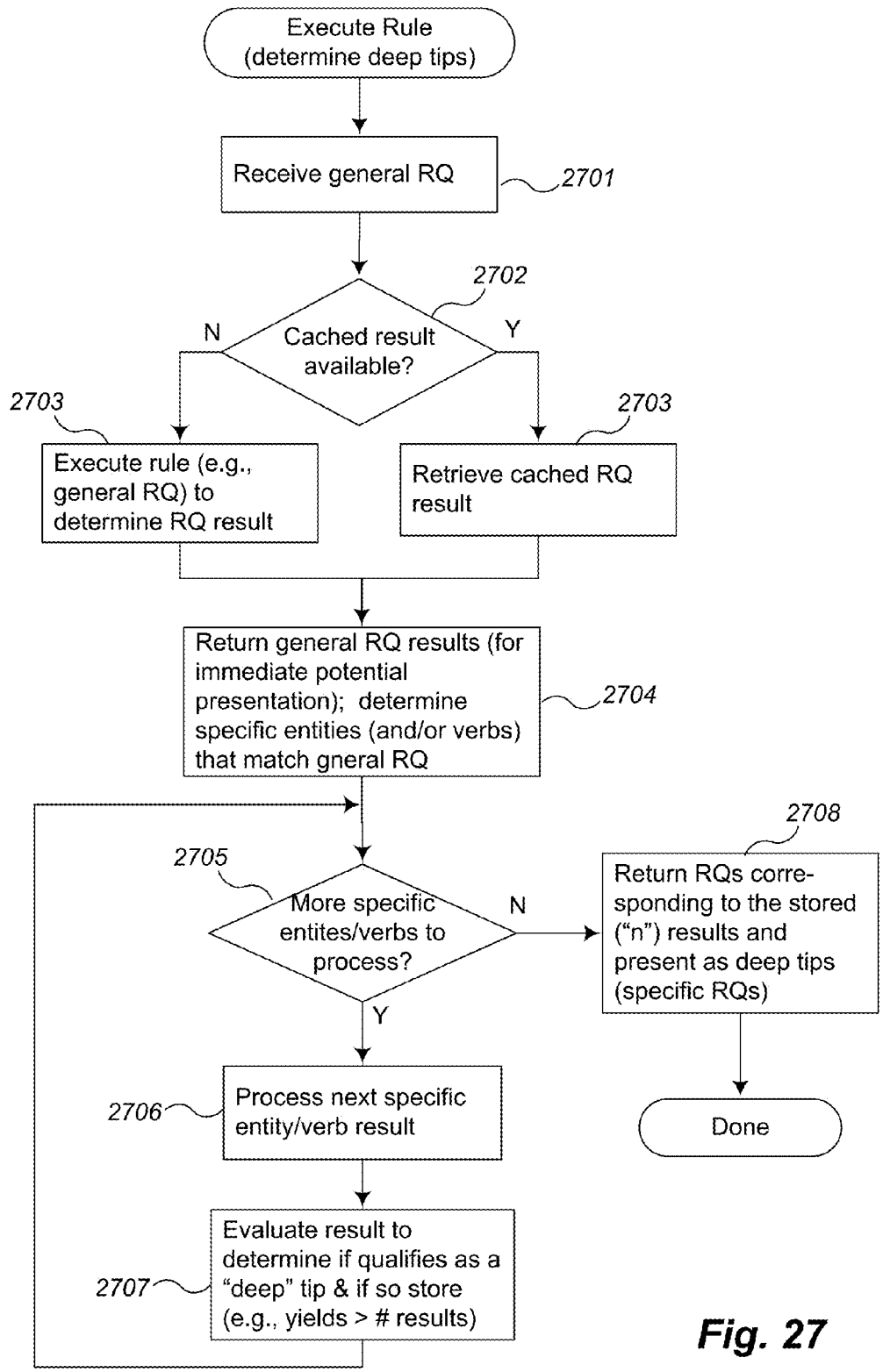
FIG. 27 is an example flow diagram of processing of a relationship query to generate deep tip results.

FIG. 27 is an example flow diagram of processing of a relationship query to generate deep tip results. and presents the corresponding relationship queries as "deep" tips. In summary, the routine executes a general relationship query (using cached results if any are available) and determines from the specific entities and/or specific verbs found in the results whether a corresponding more specific relationship query should be presented as a "deep" tip. Different evaluation processes can be incorporated in making this determination, including ranking the number of times an entity/verb appears and only presenting the top "n" in the rank, determining whether the entity/verb appears more than a threshold number of times, etc. Note that this part of all of this processing could also be performed by the tip searcher. Also, although shown as executing in a loop, the process of processing each entity/verb to obtain a specific relationship search result can be performed in parallel.

Specifically, in step 2701, the routine receives the general relationship query to execute and evaluate. (Note that, in other embodiments, the routine might just receive the rule and be responsible for determining the corresponding relationship query.) In step 2702, the routine determines whether a cached result of the general relationship query is already available and, if so, retrieves it (step 2703); otherwise in step 2603 executes the general relationship query that corresponds to the rule to determine a result. In step 2604, the routine returns the results to the tip searcher (or stores them and notifies the tip searcher) for presentation of a "general" tip, and in steps 2705-2707 processes and evaluates the specific entities and/or actions found in the results.

More specifically, in step 2705 the routine determines whether there is another entity/action to process and, if so, continues in step 2706, other continues in step 2708. In step 2706, the routine processes the next entity/action. In step 2707, the routine evaluates the search results that correspond to this entity/action to determine whether they meet the criteria associated with presenting a deep tip. This evaluation, as mentioned, may rank all of the results to determine the most frequently appearing entities/actions and/or may determine whether the number of times an entity/verb appears reaches or surpasses some threshold. Other evaluation criteria may of course be incorporated. In any case, in step 2707 once the routine determines whether an entity/action qualifies for a deep tip, it determines a corresponding relationship query using that entity/action and stores the corresponding RQ result. In step 2708 the routine returns relationship queries that correspond to the stored (or "n" number of them) results and causes them to be presented as deep tips, and then finishes processing. Note that the number of results stored/returned may be a predetermined number, a settable number, a default, etc. In addition, a preference variable may be available to change the number while the SQE is running.

Enhanced SQE Architecture

Figure 28:
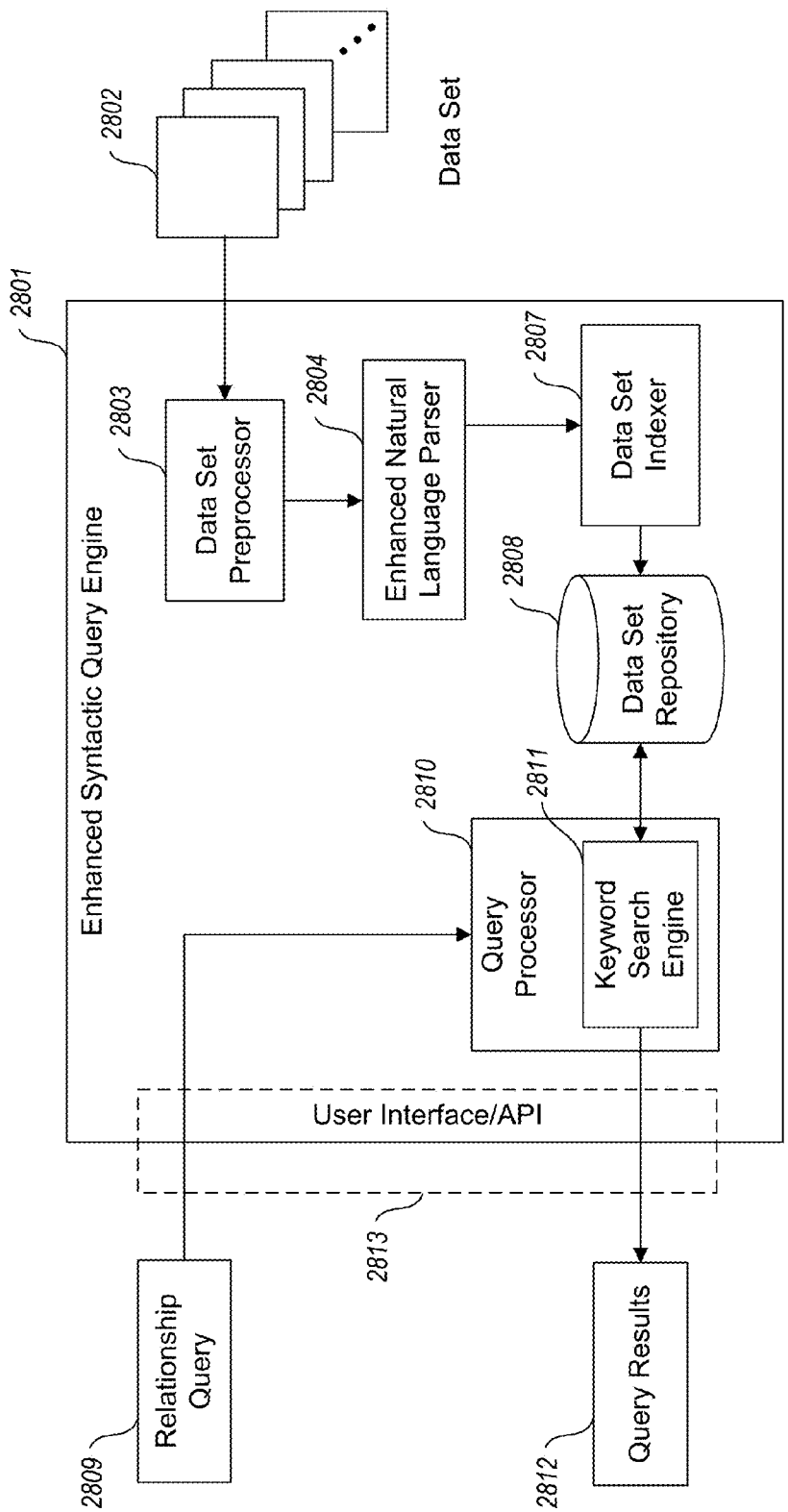
FIG. 28 is a conceptual block diagram of the components of an example embodiment of an enhanced Syntactic Query Engine.

FIG. 28 is a conceptual block diagram of the components of an example embodiment of an enhanced Syntactic Query Engine. The enhanced Syntactic Query Engine 2801 provides the enhancements and improvements described above including the context operator, metadata searching, ontology searching at the document search level, exporting relationship data, data sorting, and navigation tips. A Syntactic Query Engine 2801 comprises a Relationship Query Processor 2810, a Data Set Preprocessor 2803, a Data Set Indexer 2807, an Enhanced Natural Language Parser ("ENLP") 2804, a data set repository 2808, and, in some embodiments, a user interface (or an Applications Programming Interface "API") 2813. The Data Set Preprocessor 2803 converts received data sets 2802 to a format that the Enhanced Natural Language Parser 2804 recognizes. The Enhanced Natural Language Parser ("ENLP") 2804, parses the preprocessed sentences, identifying the syntax and grammatical role of each meaningful term in the sentence and the ways in which the terms are related to one another and/or identifies designated entity and other ontology tag types and their associated values, and transforms the sentences into a canonical form—a normalized data representation. The Data Set Indexer 2807 indexes the normalized data into the enhanced document indexes and stores them in the data set repository 2808. The Relationship Query Processor 2810 receives relationship queries and transforms them into a format that the Keyword Search Engine 2811 recognizes and can execute. (Recall that the Keyword Search Engine 2811 may be an external or 3$^{rd}$ party keyword search engine that the SQE calls to execute queries.) The Keyword Search Engine 2811 generates and executes keyword searches (as Boolean expressions of keywords) against the data set that is indexed and stored in the data set repository 2808. The Keyword Search Engine 2811 returns the search results through the user interface/API 2813 to the requester as Query Results 2812.

Details of the operation of an SQE are provided in co-pending U.S. patent application Ser. No. 11/012,089. In summary, the enhanced SQE 2801 receives as input a data set 2802 to be indexed and stored. The Data Set Preprocessor 2803 prepares the data set for parsing by assigning a Document ID to each document that is part of the received data set (and sentence and clause IDs as appropriate), performing OCR processing on any non-textual entities that are part of the received data set, and formatting each sentence according to the Enhanced Natural Language Parser format requirements. The Enhanced Natural Language Parser ("ENLP") 2804 parses the data set, identifying for each sentence, a set of terms, each term's tags, including potentially part of speech and associated grammatical role tags and any associated entity tags or ontology path information, and transforms this data into normalized data. The Data Set Indexer 2807 indexes and stores the normalized data output from the ENLP in the data set repository 2808. The data set repository 2808 represents whatever type of storage along with the techniques used to store the enhanced document indexes. For example, the indexes may be stored as sparse matrix data structures, flat files, etc. and reflect whatever format corresponds to the input format expected by the keyword search engine. After a data set (or a portion of a data set) is indexed, a Relationship Query 2809 may be submitted to the enhanced SQE 2801 for processing. The Relationship Query Processor 2810 prepares the query for parsing, for example by splitting the Relationship Query 2809 into sub-queries that are executable directly by the Keyword Search Engine 2811. As explained elsewhere, a Relationship Query 2809 is typically comprised of a syntactic search along with optional constraint expressions. Also, different system configuration parameters can be defined that influence and instruct the SQE to search using particular rules, for example, to include synonyms, related verbs, etc. Thus, the Relationship Query Processor 2810 is responsible for augmenting the specified Relationship Query 2809 in accordance with the current SQE configured parameters. To do so, the Relationship Query Processor 2810 may access the ontology information which may be stored in Data Set Repository 2808 or some other data repository. The Relationship Query Processor 2810 splits up the query into a set of Boolean expression searches that are executed by the Keyword Search engine 2811 and causes the searches to be executed. The Relationship Query Processor 2810 then receives the result of each search from the Keyword Search Engine 2811 and combines them as indicated in the original Relationship Query 2809 (for example, using Boolean operators). Note that the Relationship Query Processor 2810 may be comprised of multiple subcomponents that each execute a portion of the work required to preprocess and execute a relationship query and combine the results for presentation. The results (in portions or as required) are sent to the User Interface/API component 2813 to produce the overall Query Result 2812. The User Interface Component 2813 may interface to a user in a manner similar to that shown in the display screens of FIGS. 5-24.

The functions of data set processing (data object ingestion) and relationship query processing can be practiced in any number of centralized and/or distributed configurations of client—server systems. Parallel processing techniques can be applied in performing indexing and query processing to substantial increase throughput and responsiveness. Representative configurations and architectures are described in detail in co-pending U.S. patent application Ser. No. 11/012,089; however, a variety of other configurations could equivalently perform the functions and capabilities identified herein.

Figure 29:
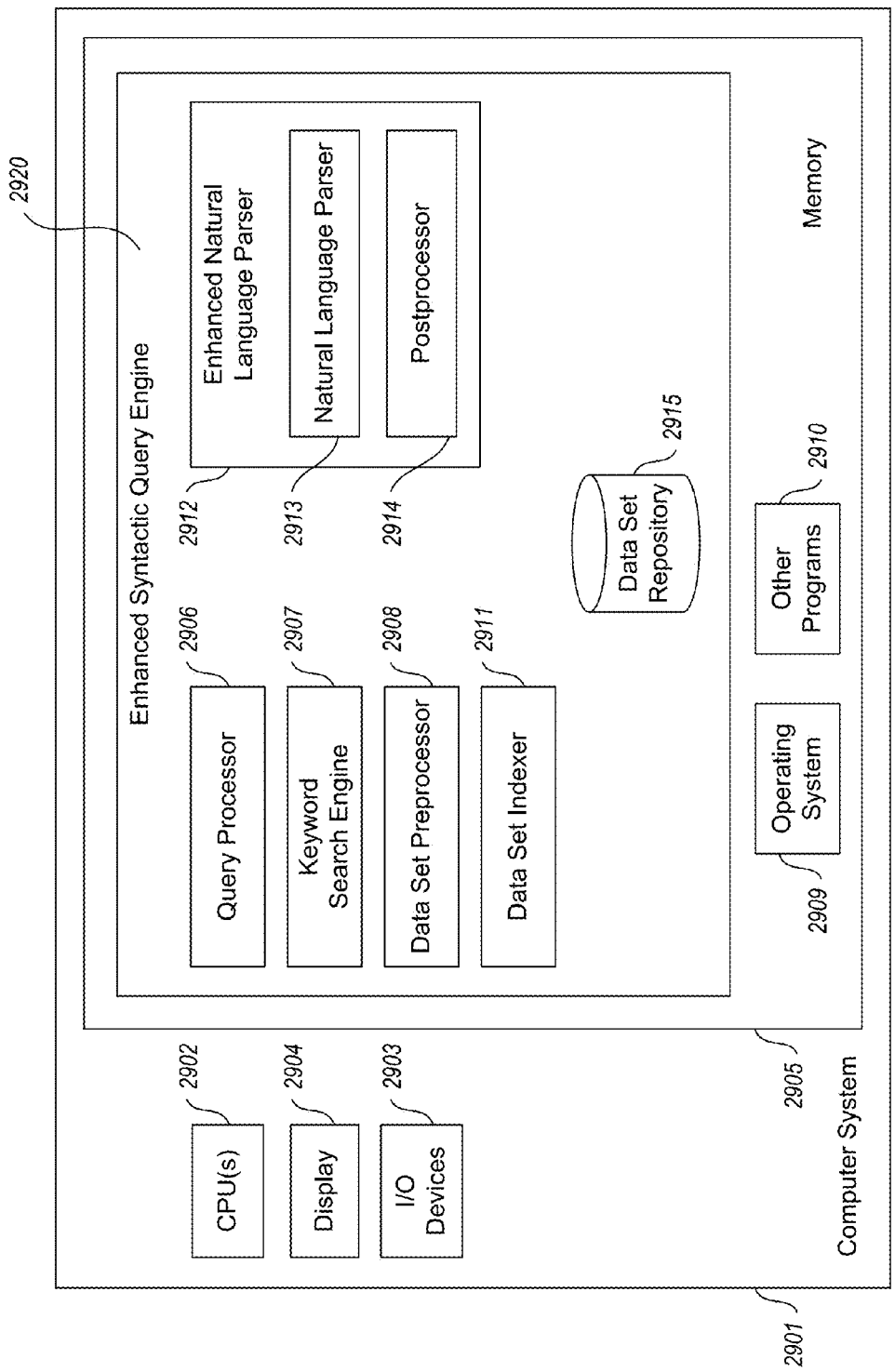
FIG. 29 is an example block diagram of a general purpose computer system for practicing embodiments of an enhanced Syntactic Query Engine.

FIG. 29 is an example block diagram of a general purpose computer system for practicing embodiments of an enhanced Syntactic Query Engine. The computer system 2901 contains one or more central processing units (CPUs) 2902, Input/Output devices 2903, a display device 2904, and a computer memory/computer-readable medium (memory) 2905. The enhanced Syntactic Query Engine 2920, including the Query Processor 2906, Keyword Search Engine 2907, Data Set Preprocessor 2908, Data Set Indexer 2911, Enhanced Natural Language Parser 2912, and data set repository 2915, preferably resides in memory/computer-readable medium 2905, with the operating system 2909 and other programs 2910 and executes on the one or more CPUs 2902. Note that the SQE may be implemented using various configurations. For example, the data set repository may be implemented as one or more data repositories stored on one or more local or remote data storage devices/computer-readable mediums. Furthermore, the various components comprising the SQE may be distributed across one or more computer systems including handheld devices, for example, cell phones or PDAs. Additionally, the components of the SQE may be combined differently in one or more different modules. The SQE may also be implemented across a network, for example, the Internet or may be embedded in another device.

As mentioned, the data structures used to store relationship data have been modified to support the enhancements described herein. Specifically, the data set indexer 2807 in FIG. 28 stores the normalized data generated from the data set using one or more data structures to provide the abstraction of a term-clause matrix, a term-sentence matrix, or a term-document matrix. Any data structure that can e understood by the target keyword search engine being used is operable with the techniques described here. In some embodiments, separate indexes exist for each enhanced document matrix (term-clause, term-sentence, term-document).

Table 1 below conceptually illustrates the modifications made to the information that is maintained in an example term-clause index to support the enhanced SQE.

TABLE 1

| Field Name | Type | Description |
| --- | --- | --- |
| documentId | Indexed, stored | document id |
| sentenceId | Indexed, stored | sentence id |
| clauseid | Indexed, stored | clause id |
| subject | tokenized, indexed | contains subjects(s), subject modifiers and entity type(s) for subjects and modifiers. The modifiers should be separated into prefix and suffix. If subject has entity type we also store t_entity (just once). If any modifier has entity type we also store tm_entity (just once). We also store noun phrases recognized by NL parser. These noun phrases are stored with spaces replaced by '\.' The subject field order is: prefix_subject_mod subject suffix_subject_mod Entity_types NLP_noun_phrases. |
| object | tokenized, indexed | contains objects(s), object modifiers and entity type(s) for objects and modifiers The modifiers should be separated into prefix and suffix. If object has entity type we also store t_entity (just once). If any modifier has entity type we also store tm_entity (just once). We also store noun phrases recognized by NL parser. We also store noun phrases recognized by NL parser. These noun phrases are stored with spaces replaced by '\.' The object field order is: prefix_object_mod object suffix_object_mod Entity_types NLP_noun_phrases. |
| pcomp | tokenized, indexed | contains pcomp(s), preposition(s), pcomp modifiers and entity type(s) for pcomp, modifiers. The modifiers should be separated into prefix and suffix. If pcomp has entity type we also store t_entity (just once). If any modifier has entity type we also store tm_entity (just once). We also store noun phrases recognized by NL parser. These noun phrases are stored with spaces replaced by '\.' The pcomp field order is: preposition pcomp modifiers, pcomp Entity_types NLP_noun_phrases |
| verb | tokenized, indexed | contains verbs(s), verb modifiers and entity type(s) for verbs and modifiers. We also store noun phrases recognized by NL parser. These noun phrases are stored with spaces replaced by '\.' The verb field order is: prefix_verb_mod verb suffix_ verb _mod Entity_types NLP_noun_phrases. |
| parent_id | indexed, stored | clause id of a parent clause |
| clause_rel_sent_class | tokenized, indexed | Contain inter-clause relationships: conditional_c causal_c prepositional_c temporal_c and Sentence Attributes: question_s definition_s temporal_s numerical_s. |
| docdate | Indexed, stored | relationship date, used for ranking/sorting of results |
| score | Indexed, stored | relationship score, used for ranking/sorting of results |
| context | tokenized and indexed | Text of the sentence that clause belongs to and neighboring sentences used in context searches. |
| context_ont_path | tokenized and indexed | Ontology paths for entities in the sentence that clause belongs to and neighboring sentences used in context searches |
| relationship | stored | Encoded clause for display: |

Table 2 below conceptually illustrates the modifications made to the information that is maintained in an example sentence index to support the enhanced SQE.

TABLE 2

| Field Name | Type | Description |
| --- | --- | --- |
| documentId | indexed | Document id |
| sentid | indexed | sentence id |
| sentenceid | | Document id, sentence id concatenated with '_' |
| sent_text | Stored, not indexed | String content of the sentence |

Table 3 below conceptually illustrates the modifications made to the information that is maintained in an example document index to support the enhanced SQE.

TABLE 3

| Field Name | Type | Description |
| --- | --- | --- |
| doc_id | Indexed, stored | Document id |
| dhs_doc_id | Indexed, stored | DHS_doc_id (URL in our case) |
| title | Indexed, stored | Document title |
| boost | tokenized and indexed | Important terms used in the document keyword searches |
| creationDate | Indexed, stored | Document creation date; format: yyyy.MM.dd-HH:mm:ss |
| document_type | Stored | Format of the document |
| docdate | Indexed, stored | document date for sorting format: yyyyMMddHH |
| metatag | Tokenized, Indexed, stored | All metatags stored as separated MetatagName#MetatagValue with spaces in names or values replaced by "/." The type of the metatag is appended to each metatag |
| ontology_path | Tokenized, Indexed, Not Stored, not stemmed | All detected Ontology paths (Entity types) prefixed by "t_". |
| content | Tokenized, Indexed, Not Stored, stemmed | String content of the document |

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 10/007,299, filed on Nov. 8, 2001, entitled "Method and System for Enhanced Data Searching," and published as U.S. Patent Publication No. 2004/0221235; U.S. patent application Ser. No. 10/371,399, filed on Feb. 19, 2003, entitled "Method and System for Enhanced Data Searching", and published as U.S. Patent Publication No. 2003/0233224; U.S. patent application Ser. No. 11/012,089, filed on Dec. 13, 2004, entitled "Method and System for Extending Keyword Searching to Syntactically and Semantically Annotated Data," and published as U.S. Patent Publication No. 2005/0267871; U.S. Provisional Application No. 60/312,385, filed on Aug. 14, 2001, entitled "Methods and Systems for Enhanced Indexing and Syntactic Searching"; U.S. Provisional Application No. 60/620,550, filed on Oct. 20, 2004, entitled "Method and System for Relationship Searching"; U.S. Provisional Application No. 60/737,446, filed on Nov. 16, 2005, entitled "Method and System for Extending Keyword Searching to Syntactically and Semantically Annotated Data; and U.S. application Ser. No. 11/601,612, filed Nov. 16, 2006, entitled "Extending Keyword Searching to Syntactically and Semantically Annotated Data" are incorporated herein by reference, in their entirety.

From the foregoing it will be appreciated that, although specific embodiments have been described herein for purposes of illustration, various modifications may be made without deviating from the spirit and scope of the present disclosure. In addition, those skilled in the art will understand how to make changes and modifications to the methods and systems described to meet their specific requirements or conditions. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.). For example, the methods and systems described herein can be applied to any type of search tool or indexing of a data set, and not just the enhanced SQE described. In addition, the techniques described may be applied to other types of methods and systems where large data sets must be efficiently reviewed. For example, these techniques may be applied to Internet search tools implemented on a PDA, web-enabled cellular phones, or embedded in other devices. Furthermore, the data sets may comprise data in any language or in any combination of languages. In addition, the user interface and API components described may be implemented to effectively support wireless and handheld devices, for example, PDAs, and other similar devices, with limited screen real estate. These and other changes may be made in light of the above-detailed description.

The invention claimed is:

1. A method in a computing system for performing enhanced electronic relationship searches on a corpus of documents, comprising:

receiving a designated query indicating one or more terms;

in response to the received designated query, determining a plurality of matching rules that correspond to at least one indicated term of the designated query, each rule including a term used to decide whether the designated query matches the rule and including a relationship search specification that specifies syntax for a corresponding relationship search to be executed as a search against the corpus when the rule is matched, the relationship search indicating one or more terms and associated syntactic and/or semantic information used to convey how the one or more terms are to be understood in relation to the corpus;

for each of the plurality of determined matching rules, determining and executing the corresponding relationship search specified by the relationship search specification against the corpus to validate whether the corresponding relationship search produces a successful result, thereby causing multiple different relationship searches to be executed against the same corpus in response to a same designated query; and for each of a plurality of the executed corresponding relationship searches that have been validated as producing a successful result, forwarding an indication of the corresponding relationship search as a suggested search tip, each suggested search tip indicative of a different relationship search applicable to the same designated query.

2. The method of claim 1 wherein the receiving the designated query further comprises receiving an indication of one or more components of a relationship query.

3. The method of claim 1 wherein the receiving the designated query further comprises receiving an indication of one or more keywords.

4. The method of claim 1 wherein the receiving the designated query comprises receiving an indication of an entity or an entity type.

5. The method of claim 4 wherein the entity or the entity type is a source for an action or for an action type or the entity or the entity type is a target for an action or for an action type.

6. The method of claim 1 wherein the receiving the designated query comprises receiving an indication of an action or an action type.

7. The method of claim 1, further comprising:
for the one or more corresponding executed relationship searches that have been validated as producing a successful result,
evaluating results of the corresponding executed relationship search that produced the successful result to determine a plurality of additional specific relationship queries to serve as additional suggested searches; and
forwarding indications of the plurality of additional specific relationship queries as additional suggested search tips.

8. The method of claim 1 wherein, for the one or more corresponding executed relationship searches that have been validated as producing a successful result, the forwarding the indication of the corresponding relationship search as a suggested search tip further comprises:
evaluating results of the corresponding executed relationship search to determine whether the results meet a set of criteria for presenting as a suggested search tip; and
when it is determined that the results meet the criteria, forwarding an indication of the corresponding relationship search as a suggested search tip.

9. The method of claim 1 wherein a corresponding executed relationship search that produces a successful result is determined by whether search results are produced from the executing the corresponding relationship search against the corpus.

10. The method of claim 1 wherein the suggested search tip is presented as a navigation tip in a visual user interface.

11. The method of claim 1, further comprising:
caching search results of one or more corresponding executed relationship searches that having been validated as producing a successful result; and
when a suggested searched tip is indicated for execution, returning the cached results of the relationship search that corresponds to the suggested search tip.

12. The method of claim 1 wherein the rules are specified by a configuration file, and further comprising:
parsing the configuration file to determine, for each rule, a relationship search specification that specifies a corresponding relationship query; and
for each determined relationship search specification, storing the corresponding relationship query along with information for matching the corresponding relationship query to a received designated query.

13. The method of claim 1 wherein the rules are specified using a tag-based scripting language or the indications of the corresponding relationship searches are presented in a ranked order.

14. The method of claim 1 wherein the executing the corresponding relationship searches is performed asynchronously.

15. The method of claim 1 wherein the determining the one or matching rules that correspond to the designated query further comprises:
determining a set of matching ontology paths that correspond to an indicated entity or entity type of the designated query.

16. The method of claim 1, further comprising:
when a suggested search tip is indicated for execution, executing the corresponding relationship search; and
presenting search results of the executed relationship search with indications of the components of the relationship query performed by the executed relationship search.

17. A computer-readable memory medium containing instructions that, when executed, control a computer processor to provide search navigation tips by performing a method comprising:
receiving a designated query indicating one or more terms;
in response to the received designated query, determining a plurality of matching rules that correspond to at least one indicated term of the designated query, each rule including a term to determine whether the designated query matches the rule and including a relationship search specification that specifies syntax for a corresponding relationship search to be executed as a search against the corpus when the rule is matched, the relationship search indicating one or more terms and associated syntactic and/or semantic information used to convey how the one or more terms are to be understood in relation to the corpus;
for each of the plurality of determined matching rules, determining and executing the corresponding relationship search specified by the relationship search specification asynchronously against the corpus to validate whether the corresponding relationship search produces a successful result, thereby causing multiple different relationship searches to be executed against the same corpus in response to a same designated query; and
for each of a plurality of the executed corresponding relationship searches that have been validated as producing a successful result, forwarding an indication of the corresponding relationship search as a suggested search tip, each suggested search tip indicative of a different relationship search applicable to the same designated query.

18. The computer-readable medium of claim 17 wherein the receiving the designated query further comprises receiving an indication of one or more components of a relationship query.

19. The computer-readable medium of claim 17 wherein the receiving the designated query further comprises receiving an indication of more or more keywords.

20. The computer-readable medium of claim 17 wherein the receiving the designated query comprises receiving an indication of one or more of an entity, an entity type, an action, or an action type.

21. The computer-readable medium of claim 17, the method further comprising:
for the one or more executed corresponding relationship searches that have been validated as producing a successful result,
evaluating results of the executed corresponding relationship search that produced the successful result to determine a plurality of more specific relationship queries to serve as additional suggested searches; and
forwarding indications of the plurality of more specific relationship queries as additional suggested search tips.

22. The computer-readable medium of claim 17, the method further comprising:
- caching search results of one or more executed corresponding relationship searches that have been validated as producing a successful result; and
- when a suggested searched tip is indicated for execution, returning the cached results of the executed relationship search that corresponds to the suggested search.

\* \* \* \* \*